(12) United States Patent
Yoon et al.

(10) Patent No.: US 11,947,772 B2
(45) Date of Patent: Apr. 2, 2024

(54) ELECTRONIC DEVICE FOR DISPLAYING SOURCE INFORMATION OF FILE AND OPERATION METHOD OF SAME

(71) Applicant: SAMSUNG ELECTRONICS CO., LTD., Suwon-si (KR)

(72) Inventors: Seongsu Yoon, Suwon-si (KR); Junho Kim, Suwon-si (KR); Hyejung Kim, Suwon-si (KR); Jaehong Cheon, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/889,060

(22) Filed: Aug. 16, 2022

(65) Prior Publication Data
US 2023/0085462 A1 Mar. 16, 2023

Related U.S. Application Data

(63) Continuation of application No. PCT/KR2022/007745, filed on May 31, 2022.

(30) Foreign Application Priority Data

Sep. 7, 2021 (KR) .................. 10-2021-0119364
Nov. 26, 2021 (KR) .................. 10-2021-0166030

(51) Int. Cl.
*G06F 3/04817* (2022.01)
*G06F 3/0488* (2022.01)
*G06F 16/14* (2019.01)

(52) U.S. Cl.
CPC ........ *G06F 3/04817* (2013.01); *G06F 3/0488* (2013.01); *G06F 16/148* (2019.01); *G06F 2203/04803* (2013.01)

(58) Field of Classification Search
CPC .. G06F 3/04817; G06F 3/0488; G06F 16/148; G06F 16/13; G06F 2203/04803
See application file for complete search history.

(56) References Cited

U.S. PATENT DOCUMENTS

2005/0240878 A1   10/2005   Anthony et al.
2005/0251758 A1*  11/2005   Cummins ........... G06F 3/04817
                                                715/838

(Continued)

FOREIGN PATENT DOCUMENTS

KR   20080024531 A   3/2008
KR   20140108445 A   9/2014

(Continued)

OTHER PUBLICATIONS

International Search Report and Written Opinion for International Application No. PCT/KR2022/007745; International Filing Date May 31, 2022; dated Aug. 31, 2022; 9 Pages.

*Primary Examiner* — Mong-Shune Chung
(74) *Attorney, Agent, or Firm* — CANTOR COLBURN LLP

(57) ABSTRACT

According to various embodiments, an electronic device including a memory, and at least one processor may be provided, wherein the at least one processor stores, in the memory, multiple files acquired based on execution of multiple applications and information on the multiple files including first information on the multiple applications and second information associated with the multiple files, executes a first application including at least one of an authority or a function for acquiring the information on the multiple files, and displays a first execution screen of the executed first application having a partial area including multiple thumbnails associated with at least some of the multiple files and multiple icons corresponding to applica- (Continued)

tions, based on at least a part of the first information included in the information on the multiple files. Various other embodiments are possible.

16 Claims, 26 Drawing Sheets

(56) References Cited

U.S. PATENT DOCUMENTS

| | | |
|---|---|---|
| 2012/0144067 A1 | 6/2012 | Buckley |
| 2012/0272231 A1 | 10/2012 | Kwon et al. |
| 2013/0205251 A1 | 8/2013 | Cisler et al. |
| 2014/0245448 A1 | 8/2014 | Moon et al. |
| 2014/0289872 A1 | 9/2014 | Mun et al. |
| 2014/0304285 A1* | 10/2014 | An ................... G06F 16/13 707/756 |
| 2014/0344758 A1* | 11/2014 | Kozakura ........ G06F 3/04842 715/835 |
| 2015/0127674 A1* | 5/2015 | Ito ..................... G06F 3/0488 707/758 |
| 2016/0070432 A1* | 3/2016 | Caporal ............... H04L 63/20 715/767 |
| 2016/0275095 A1* | 9/2016 | Yokoyama ........ G06F 3/04855 |
| 2017/0038922 A1* | 2/2017 | Eim ..................... H04W 4/50 |
| 2021/0357367 A1* | 11/2021 | Yazganarikan ..... G06F 3/0486 |

FOREIGN PATENT DOCUMENTS

| | | |
|---|---|---|
| KR | 20140116611 A | 10/2014 |
| KR | 20140121052 A | 10/2014 |
| KR | 1020170008153 A | 1/2017 |
| KR | 20170016165 A | 2/2017 |

* cited by examiner

| _id | _data | latitude | longitude | tags | owner_package_name | download_uri | referer_uri |
|---|---|---|---|---|---|---|---|
| ... | Filter | Filter | Filter | Filter | Filter | Filter | Filter |
| 33 | /storage/emulated/0/KakaoTalk/cookie/... | NULL | NULL | NULL | com.kaka.talk | NULL | NULL |
| 34 | /storage/emulated/0/Pictures/KakaoTalk | NULL | NULL | NULL | NULL | NULL | NULL |
| 36 | /storage/emulated/0/DCIM/Camera | NULL | NULL | NULL | NULL | NULL | NULL |
| 15 | /storage/emulated/0/Music | NULL | NULL | NULL | NULL | NULL | NULL |
| 16 | /storage/emulated/0/Music/Samsung | NULL | NULL | NULL | NULL | NULL | NULL |
| 18 | /storage/emulated/0/Android | NULL | NULL | NULL | NULL | NULL | NULL |
| 19 | /storage/emulated/0/Android/media | NULL | NULL | NULL | NULL | NULL | NULL |
| 30 | /storage/emulated/0/.face | NULL | NULL | NULL | NULL | NULL | NULL |
| 38 | /storage/emulated/0/Download/... | NULL | NULL | NULL | com.sec.android.app.sbrowser | https://search.pstatic.net/... | https://m.search.naver.com/search.naver?... |
| 35 | /storage/emulated/0/Pictures/KakaoTalk/... | NULL | NULL | NULL | com.kakao.talk | NULL | NULL |
| 29 | /storage/emulated/0/DCIM/test13.JPG | NULL | NULL | NULL | NULL | NULL | NULL |
| 28 | /storage/emulated/0/DCIM/test12.JPG | NULL | NULL | NULL | NULL | NULL | NULL |
| 37 | /storage/emulated/0/DCIM/Camera/... | NULL | NULL | NULL | com.sec.android.app.camera | NULL | NULL |

FIG. 4B

ELECTRONIC DEVICE FOR DISPLAYING SOURCE INFORMATION OF FILE AND OPERATION METHOD OF SAME

CROSS-REFERENCE TO RELATED APPLICATIONS

This application is a continuation of International Application No. PCT/KR2022/007745 designating the United States, filed on May 31, 2022, in the Korean Intellectual Property Receiving Office and claiming priority to Korean Patent Application No. 10-2021-0166030, filed on Nov. 26, 2021, in the Korean Intellectual Property Office, and claiming priority to Korean Patent Application No. 10-2021-0119364, filed on Sep. 7, 2021, in the Korean Intellectual Property Office, the disclosures of which are incorporated by reference herein in their entireties.

BACKGROUND

Field

Various embodiments of the disclosure relate to an electronic device for displaying source information of a file and an operation method of the same.

Description of Related Art

With the rapid development of electronic devices in recent years, an electronic device enabling wireless voice communication and information exchange has become a daily necessity. In an early stage of electronic device supply, the electronic device was simply recognized as a terminal that is portable and enables wireless communication. However, with the development of the technology and the introduction of wireless Internet, the electronic device is not only used for the purpose of simple telephone communication or schedule management, but also expands its utilization range to include functions such as games, a remote controller using a short-distance communication, and image capturing using a built-in camera, and therefore satisfy user needs.

As various types of services are provided to consumers, the amount of data, information, and/or files stored in an electronic device is rapidly increasing.

Accordingly, implementation of a technology for efficiently providing data, information, and/or information on files stored in an electronic device is required.

An electronic device may store various types of files in a memory, based on execution of various types of applications (or programs). However, since an intuitive graphical user interface indicating sources (e.g., applications used to acquire files) of various types of files stored by an electronic device is not provided, a user using the electronic device may have difficulty in identifying sources of respective files individually. For example, even if the same type of files (e.g., a media file type), since there are multiple types of applications (e.g., a camera application and a web application) for acquiring the files, it may be difficult for a user to identify various types of applications to use a specific file. In particular, as a use time of an electronic device passes, the number of files stored in the electronic device increases, and thus the difficulties of a user may become worse. As a result, as a user proceeds with a process of individually identifying a source for each file by using an electronic device, the operational burden of the electronic device may also be increased.

According to various embodiments, an electronic device and an operation method thereof may provide a graphic user interface which allows a user to intuitively identify a source of a file, thereby ultimately reducing the operational burden for file management of the electronic device as well as improving convenience in file management of the user.

SUMMARY

According to various embodiments, an electronic device may be provided, the electronic device including a memory, and at least one processor, wherein the at least one processor stores, in the memory, multiple files acquired based on execution of multiple applications and information on the multiple files, the information on the multiple files including first information on the multiple applications and second information associated with the multiple files, executes a first application, the first application including at least one of an authority or a function for acquiring the information on the multiple files, and displays a first execution screen of the executed first application, based on at least a part of the first information included in the information on the multiple files, the first execution screen having a partial area including multiple thumbnails associated with at least some of the multiple files and multiple icons corresponding to applications associated with the at least some of the multiple files from among the multiple applications, which are displayed at positions associated with the multiple thumbnails.

According to various embodiments, an operation method of an electronic device may be provided, and the operation method includes storing, in a memory of the electronic device, multiple files acquired based on execution of multiple applications and information on the multiple files, the information on the multiple files including first information on the multiple applications and second information associated with the multiple files, includes executing a first application, the first application including at least one of an authority and/or a function for acquiring the information on the multiple files, and includes displaying a first execution screen of the executed first application, based on at least a part of the first information included in the information on the multiple files, the first execution screen having a partial area including multiple thumbnails associated with at least some of the multiple files and multiple icons corresponding to applications associated with the at least some of the multiple files from among the multiple applications, which are displayed at positions associated with the multiple thumbnails.

According to various embodiments, an electronic device may be provided, the electronic device including a memory and at least one processor, wherein the at least one processor is configured to store, in the memory, multiple files acquired based on execution of multiple applications and information on the multiple files, the information on the multiple files including first information on the multiple applications and second information associated with the multiple files, to execute a first application, the first application having an authority for the information on the multiple files, to display a first execution screen of the executed first application, based on at least a part of the first information included in the information on the multiple files, the first execution screen having a partial area including multiple thumbnails associated with at least some of the multiple files and multiple icons corresponding to applications associated with the at least some of the multiple files from among the multiple applications, which are displayed at positions associated with the multiple thumbnails, to identify, if a first icon corresponding to the first application is selected from among the multiple icons, multiple first files corresponding to the first application from among the multiple files, and to display a second execution screen including the identified multiple first files, based on at least a part of the second information included in the information on the multiple files, wherein on the second execution screen the multiple first files are displayed for each some files having the corresponding second information.

Technical solutions according to various embodiments are not limited to the technical solutions described above, and other technical solutions that not mentioned will be clearly understood by those skilled in the art, to which the disclosure belongs, based on the following description and the appended drawings.

According to various embodiments, provided may be an electronic device and an operation method thereof, which provide a graphic user interface configured to allow a user to intuitively identify an source of a file, thereby ultimately reducing the operational burden for file management of the electronic device as well as improving convenience in file management of the user.

BRIEF DESCRIPTION OF THE DRAWINGS

The above and other aspects, features and advantages of certain embodiments of the present disclosure will be more apparent from the following description taken in conjunction with the accompanying drawings, in which:

FIG. 4B is a diagram for illustrating an example of a file database stored in the electronic device according to various embodiments;

DETAILED DESCRIPTION

Figure 1:
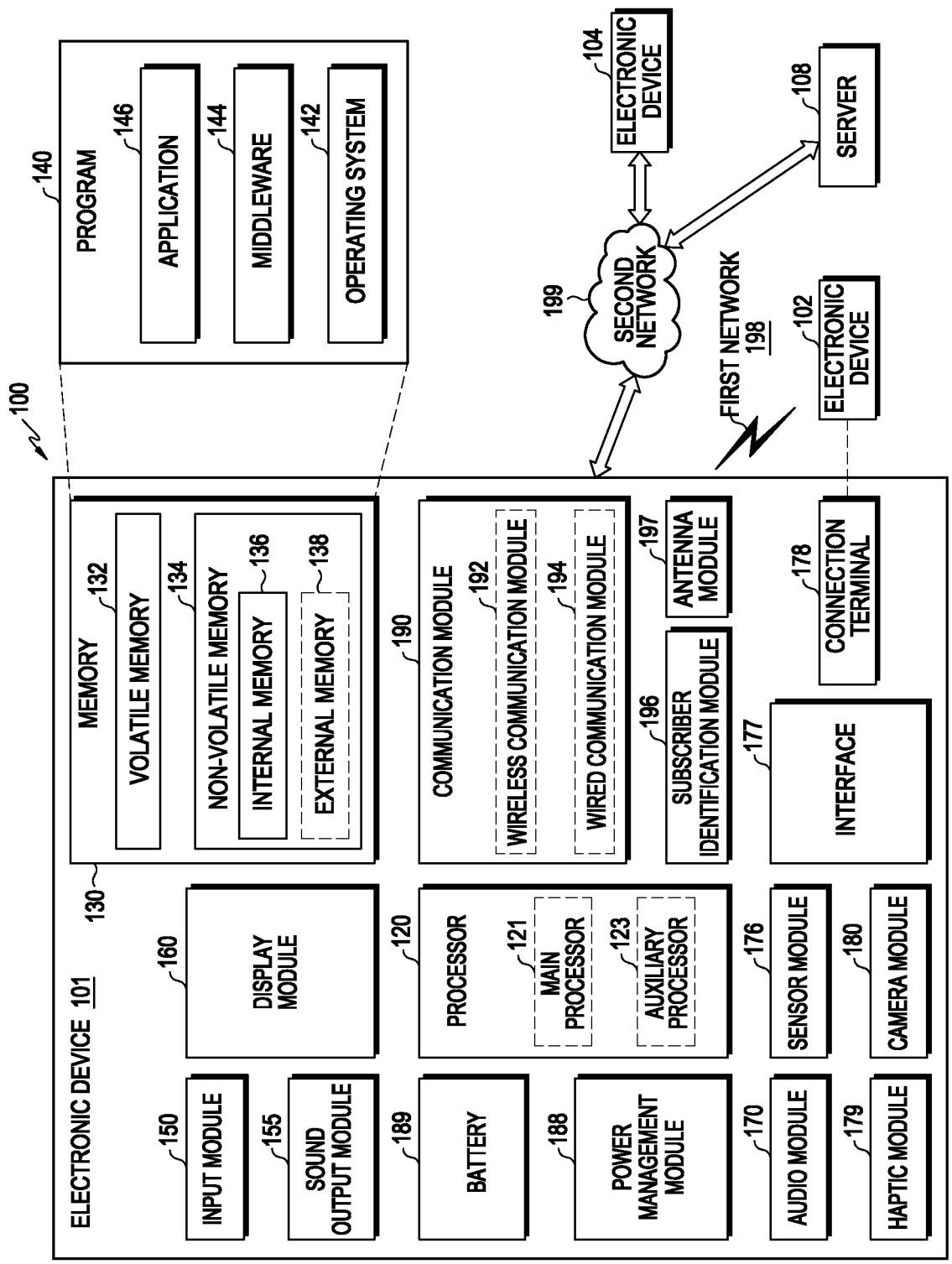
FIG. 1 is a block diagram of an electronic device in a network environment according to various embodiments.

The disclosure now will be described more fully hereinafter with reference to the accompanying drawings, in which various embodiments are shown. The disclosure may, however, be embodied in many different forms, and should not be construed as limited to the embodiments set forth herein.

Rather, these embodiments are provided so that this disclosure will be thorough and complete, and will fully convey the scope of the disclosure to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, and/or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, an example of an operation of an electronic device 200 (e.g., the electronic device 101 of FIG. 1) according to various embodiments is described.

Figure 2:
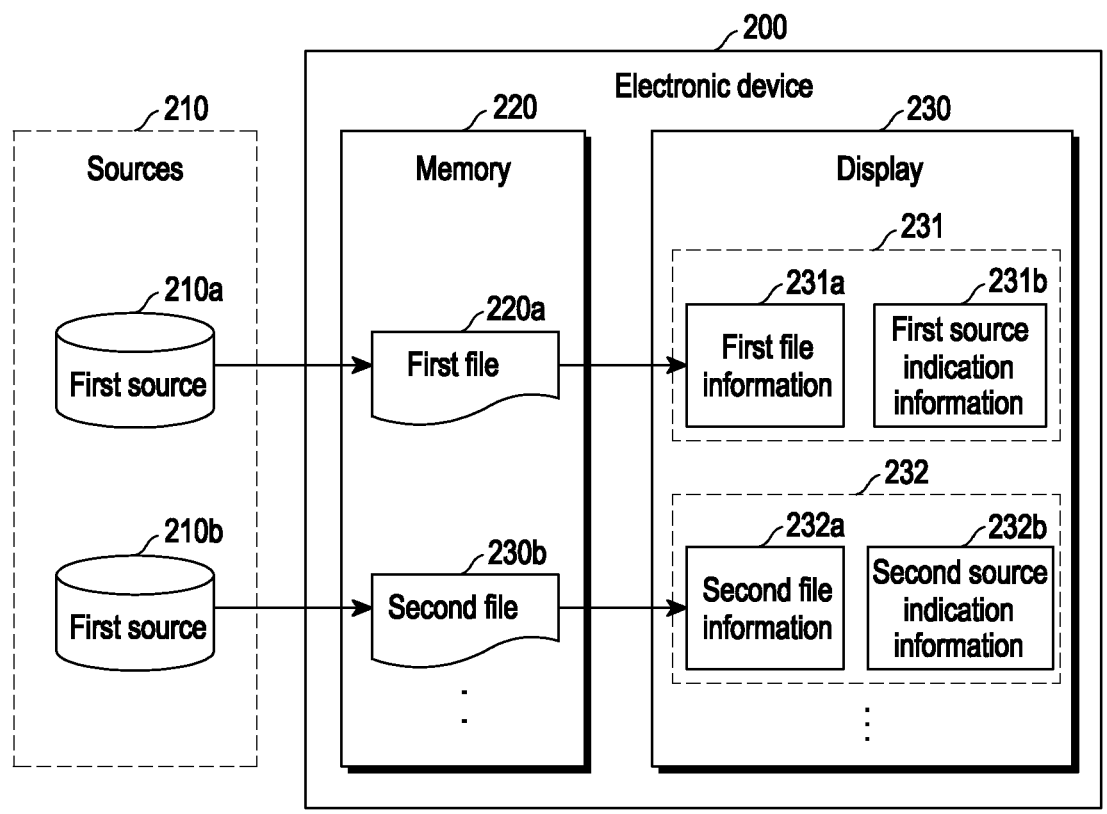
FIG. 2 is a diagram for illustrating an example of an operation of an electronic device according to various embodiments.

FIG. 2 is a diagram for illustrating an example of an operation of the electronic device 200 according to various embodiments.

According to various embodiments, referring to FIG. 2, the electronic device 200 may provide (i.e., display on a display 230) information 231 and 232 on files (e.g., a first file 220a and second file 220b) acquired from different (or various) sources 210 (or sources) (e.g., a first source 210a and a second source 210b). The information 231 and information 232 on the files may include file information (e.g., first file information 231a and second file information 232a) and source indication information (e.g., first source indication information 231b and second source indication information 232b) indicating sources of the files (e.g., the first file 220a and the second file 220b). The files (e.g., the first file 220a and the second file 220b) may be understood as data, information, and/or contents. The files (e.g., the first file 220a and the second file 220b) may include media files, such as images, video, and/or audio, document files, and installation files (e.g., an Android application package (apk)) and may further include more types of files, without being limited to the description. For example, the sources (e.g., the first source 210a and the second source 210b) may refer to (or include or indicate) an application (or program) used to acquire the files, and may refer to various types of software and/or hardware to acquire files, such as a device used to acquire a file, without being limited to the description. Even files of the same type may be acquired and/or stored by the electronic device 200 by using different types of sources (e.g., applications).

According to various embodiments, the file information (e.g., the first file information 231a and the second file information 232a) may include information associated with files (e.g., the first file 220a and the second file 220b), which enables file recognition by a user (e.g., enables recognition separately from other files). The information associated with the files (e.g., the first file 220a and the second file 220b) may include at least one piece of information on thumbnails associated with the files, file names, or file acquisition times (or storing times) (e.g., hour/second/day/month/year), and may further include various types of information (e.g., a file storage path and a file type) enabling file recognition by a user, without being limited to the description.

According to various embodiments, the source indication information (e.g., the first source indication information 231*b* and the second source indication information 232*b*) may include information associated with sources of the files, which enables recognition of the sources (e.g., an application (or program)) used to acquire the files. The information associated with the sources of the files may include icons indicating the sources, and may include various types of information enabling recognition of the sources of the files by a user, without being limited to the description.

According to various embodiments, the electronic device 200 may provide the file information (e.g., the first file information 231*a* and the second file information 232*a*) and the source indication information (e.g., the first source indication information 231*b* and the second source indication information 232*b*) in a form associated with each other. For example, the electronic device 200 may display file information and source indication information corresponding to a specific file at positions adjacent to each other, on an execution screen of a specific application (or program) (a file application to be described later). The electronic device 200 may provide various functions (e.g., an application screen display function and an alignment function) according to selection of the source indication information, which will be described later.

Hereinafter, an example of a configuration of the electronic device 200 (e.g., the electronic device 200 of FIG. 1) according to various embodiments will be described.

Figure 3:
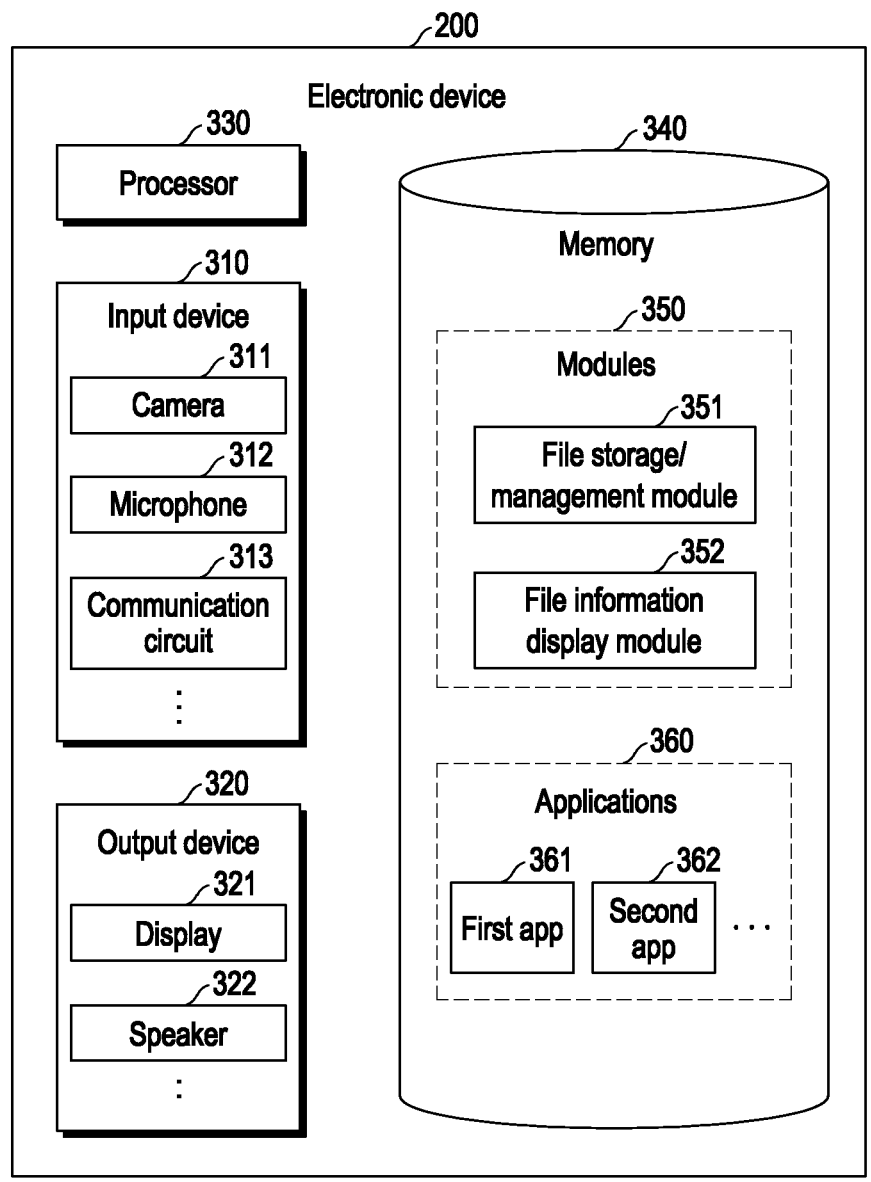
FIG. 3 is a diagram illustrating an example of a configuration of the electronic device according to various embodiments.

FIG. 3 is a diagram illustrating an example of a configuration of the electronic device 200 according to various embodiments. Hereinafter, FIG. 3 will be described with reference to FIG. 4A and FIG. 4B.

Figure 4A:
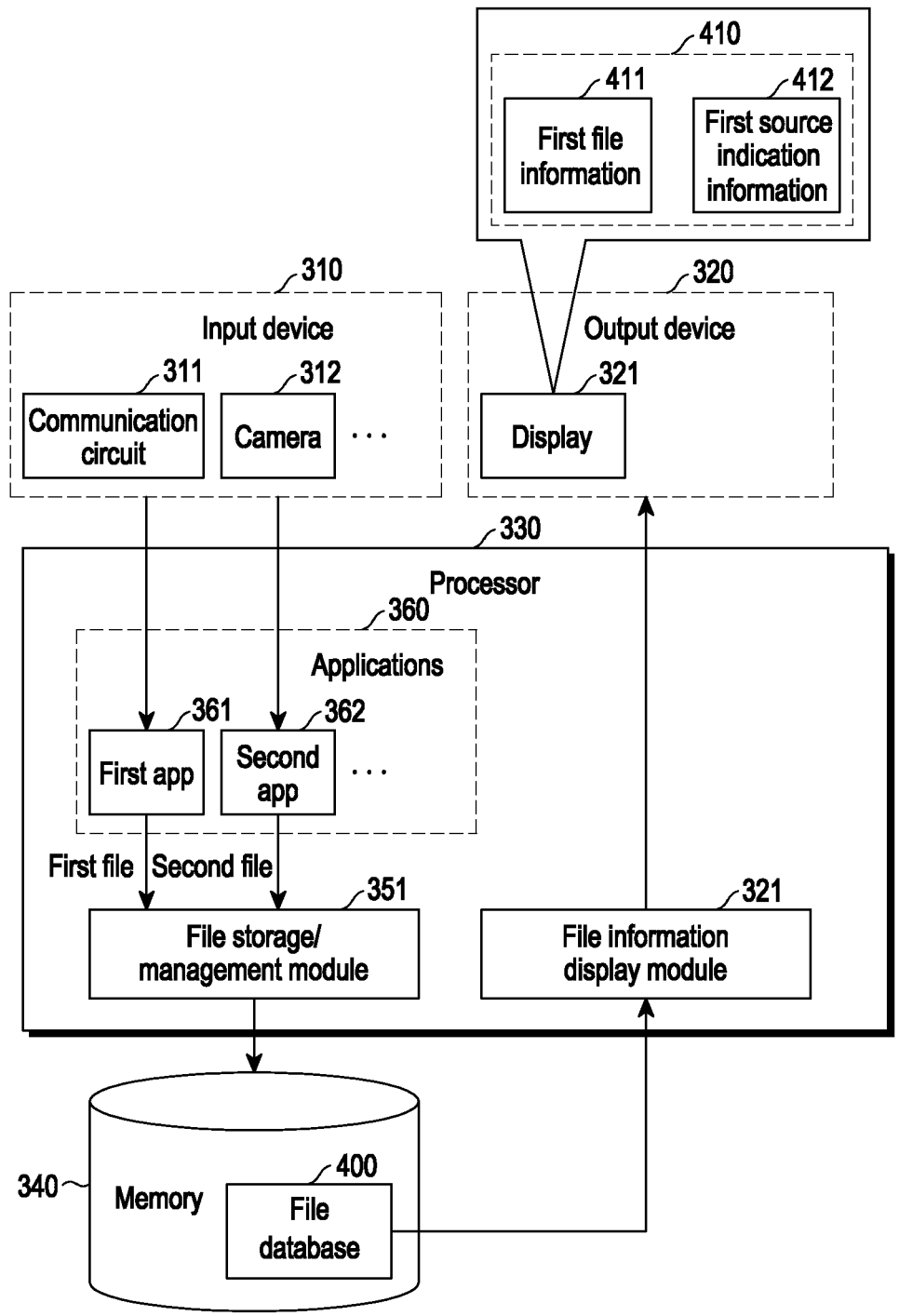
FIG. 4A is a diagram for illustrating an example of an operation of displaying file information and source indication information of the electronic device according to various embodiments.

FIG. 4A is a diagram for illustrating an example of an operation of displaying file information and source indication information of the electronic device 200 according to various embodiments. FIG. 4B is a diagram for illustrating an example of a file database 400 stored in the electronic device 200 according to various embodiments.

According to various embodiments, as illustrated in FIG. 3, the electronic device 200 may include an input device 310, an output device 320, a processor 330, and a memory 340 in which multiple modules 350 (e.g., a file storage/management module 351 and a file information display module 352) and applications 360 (e.g., a first app 361 and a second app 362) are stored. Without being limited to descriptions and/or illustrations, the electronic device 200 may be implemented to include more elements (or devices and electronic components) or to include fewer components.

According to various embodiments, the modules (e.g., the file storage/management module 351 and the file information display module 352) implemented (or stored) in the electronic device 200 may be implemented in a form of an application, a program, a computer code, instructions, a routine, a process, software, or firmware, which can be executed by the processor 330, or a combination of at least two or more thereof. For example, when the modules (e.g., the file storage/management module and the file information display module 352) are executed, the processor 330 may perform each corresponding operation. Therefore, hereinafter, a description that a specific module performs an operation may be understood as indication that the processor 330 performs an operation corresponding to the specific module as the specific module is executed. Without being limited to descriptions, functions of at least some of the modules (e.g., the file storage/management module 351 and the file information display module 352) may be implemented as separate software. For example, as will be described later, the file information display module 352 may be implemented as a part of functions of an application (a file application to be described later) (or program) for file management. Without being limited to descriptions, at least some of the modules (e.g., the file storage/management module 351 and the file information display module 352) may be implemented in a hardware form (e.g., a processing circuit).

Hereinafter, an example of a configuration of the electronic device 200 according to various embodiments will be described.

According to various embodiments, the input device 310 may refer to devices for acquiring various types of information. For example, as illustrated in FIG. 3, the input device 310 may include a camera 311 (e.g., the camera module 180 of FIG. 1), a microphone 312, and a communication circuit 313 (e.g., the communication module 190 of FIG. 1), but is not limited to the description and/or illustration, and devices for acquiring various types of information may be further implemented as the input device 310 in the electronic device 200. For example, the devices described in the input module 150 of FIG. 1 may be further implemented as the input device 310 in the electronic device 200.

According to various embodiments, the output device 320 may refer to devices that provide various types of contents (e.g., a visual content, an auditory content, and a tactile content) recognizable by a user (i.e., being capable of stimulating five senses of a user). For example, as illustrated in FIG. 3, the output device 320 may include a display 321 (e.g., the display module 160 of FIG. 1) and a speaker 322 (e.g., the audio module 170 of FIG. 1), but is not limited to the description and/or illustration, and devices for providing a content may be further implemented as the output device 320 in the electronic device 200.

According to various embodiments, the processor 330 may include at least one of an application processor (AP), a central processing unit (CPU), a graphic processing unit (GPU), a display processing unit (DPU), or a neural processing unit (NPU). As described above, according to execution of modules (e.g., a copy app generation module 351, an account management module 353, and a file management module 355), the processor 330 may perform an operation (or provide a function). Operations of the modules described below (e.g., the file storage/management module 351 and the file information display module 352) may be understood as operations of the processor 330.

According to various embodiments, the file storage/management module 351 may acquire various types of files, based on execution of an application, and may store, in the memory 340, the file database 400 including the acquired various types of files and information on the files. For example, the electronic device 200 (e.g., a processor) may acquire files (e.g., a first file and a second file) for respective applications, based on driving of hardware devices (e.g., an input device), based on execution of the applications (e.g., the first app and the second application). For example, based on execution of a messenger application, the electronic device 200 may receive a file from another external electronic device 200 and may acquire (e.g., download) the received file, via a communication circuit. As another example, based on execution of a camera application, the electronic device 200 may perform photographing using a camera and may acquire a file (e.g., an image file), based on the performing of photographing. As illustrated in FIG. 3A, the file storage/management module may store, in the memory 340, files (e.g., a first file and a second file) acquired based on execution of the applications (e.g., a first app and a second app) and may store, as the file database 400 in the memory 340, information on the files stored in the memory 340. For example, the file database 400 may be a media provider database implemented by an Android operating system (OS).

According to various embodiments, FIG. 4B shows an example (e.g., a media store database) of implementation of the file database 400. Referring to FIG. 4B, information on files stored as the file database 400 may include identification information 400a of the file, information 400b on a source of the file, and additional information 400c on the file. The identification information 400a of the file may include an identifier (e.g., an ID) for identification of the file. The information 400b on the source of the file may include information on identification information (e.g., an application package name) of an application (or program) used to acquire the file, but may further include various types of information for identification of the source of the file, without being limited to the description. In addition, the additional information 400c on the file may include information on at least one of a logical path 401 in which the file is stored, information (e.g., a latitude and longitude) 402 on a file acquisition position, a download link (e.g., a uniform resource indicator (URI)) 403 of the file, a reference link 404 from which the file is retrieved, a link (not illustrated) to a chat room to which the file is attached, an identifier (e.g., an ID, a nickname, and a name) of a counterpart user in the chat room, a name (not illustrated) of the chat room, a link (not illustrated) to a mail (e.g., a sending mail or a receiving mail) to which the file is attached, a mail address (not illustrated) of a counterpart of the mail (e.g., a sending mail or a receiving mail) to which the file is attached, or a deep link (not illustrated) for accessing a page (or screen) of the application, which includes the file, and may include various types of information associated with the file, other than the source of the file, without being limited to the description. Referring to FIG. 4B, the file database 400 may include source information 400b and additional information 400c corresponding to identification information 400a of a specific file, in a form associated with the identification information. For example, the source information 400b and the additional information 400c may be stored in the file database 400, as column information on the identification information 400a of files. The column information may be defined as information stored for each column.

According to various embodiments, as at least a part of an operation of storing the file database 400 in the memory 340, the file storage/management module 351 may store additional information corresponding to a type (or category) of an application corresponding to a file. An application (or program) may be classified by type. The type of the application may include a web application type, a messenger application type including a message application and a social network service (SNS), a camera application type, and an email application type, but is not limited to the aforementioned types, and applications may be classified into more types. In an embodiment, when a file is acquired using an application corresponding to the web application type, the file storage/management module 351 may acquire, as additional information of the file, a downlink of the file and/or a reference link of the file. In another embodiment, when a file is acquired using an application corresponding to the messenger application type, the file storage/management module 351 may acquire, as additional information of the file, a link to a chat room in which the file has been acquired, and/or personal information (e.g., a name and contact information) of another user having transmitted the file. In another embodiment, when a file is acquired using an application corresponding to the camera application type, the file storage/management module 351 may acquire, as additional information of the file, information on a region in which the file has been acquired. In another embodiment, when a file is acquired using an application corresponding to the email application type, the file storage/management module 351 may acquire information on an e-mail address of another user associated with the file. The file storage/management module may store additional information acquired as described above, as column information on an identifier of a specific file in the file database 400. Accordingly, the file information display module 352 may acquire column information corresponding to a specific file stored in the file database 400 and may, based on the acquired column information, display source indication information and/or provide functions (e.g., an application screen providing function and/or an alignment function), which will be described later.

According to various embodiments, the file information display module 352 may provide (e.g., display), using an output device (e.g., the display 321), file information on files stored in the memory 340 and information 410 (e.g., file information 411 and source indication information 412) on files acquired based on the file database 400. For example, the file information display module 352 may display, as the file information 411, at least one of a file name or information on a file acquisition time (or storing time) (e.g., hour/second/day/month/year), and may display, as the source indication information 412, an icon indicating an application having acquired the file. The file information display module 352 may be implemented as a function of a file application (e.g., my file application) implemented to manage files stored in the electronic device 200, and therefore the file information 411 and the source indication information 412 may be displayed on an execution screen of the file application. In addition to the file application described above, an operation of the electronic device 200 may be performed based on an application (e.g., a gallery application, etc.) implemented to provide a service associated with multiple files stored in the electronic device 200. An example of an operation of the file information display module 352 will be described in detail later.

Hereinafter, examples of operations of the electronic device 200 according to various embodiments will be described.

According to various embodiments, the electronic device 200 may display file information (e.g., a thumbnail, a name, and time) on at least some of multiple files stored in the memory 340 and icons for indication of sources of at least some of the multiple files, in a partial area of an execution screen of a file application 611.

Figure 5:
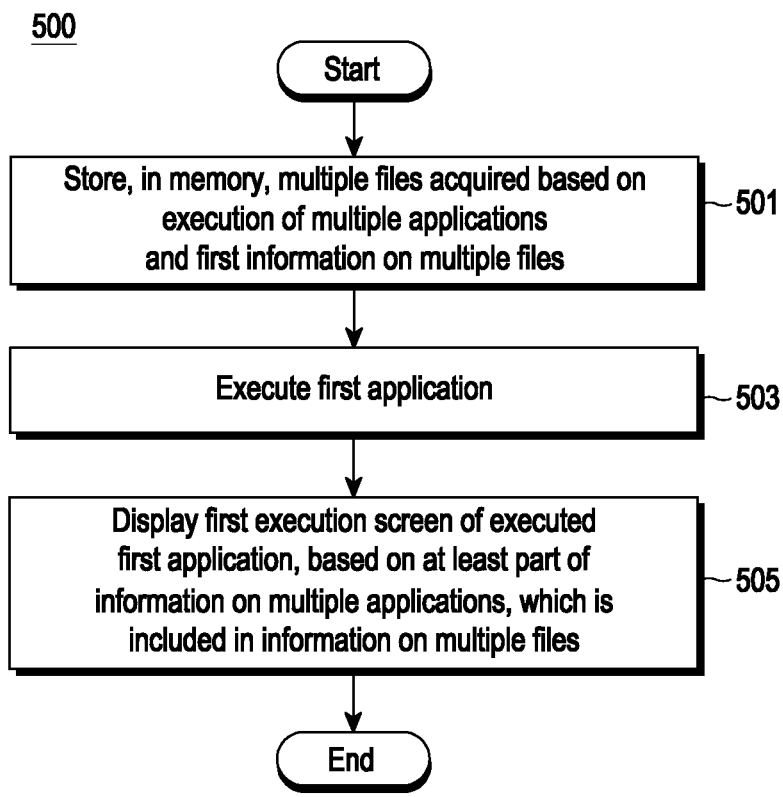
FIG. 5 is a flowchart for illustrating an example of an operation of the electronic device according to various embodiments.

FIG. 5 is a flowchart 500 for illustrating an example of an operation of the electronic device 200 according to various embodiments. According to various embodiments, the operations illustrated in FIG. 5 are not limited to the illustrated order and may be performed in various orders. According to various embodiments, more operations or at least one fewer operation than those illustrated in FIG. 5 may be performed. Hereinafter, FIG. 5 will be described with reference to FIG. 6.

Figure 6:
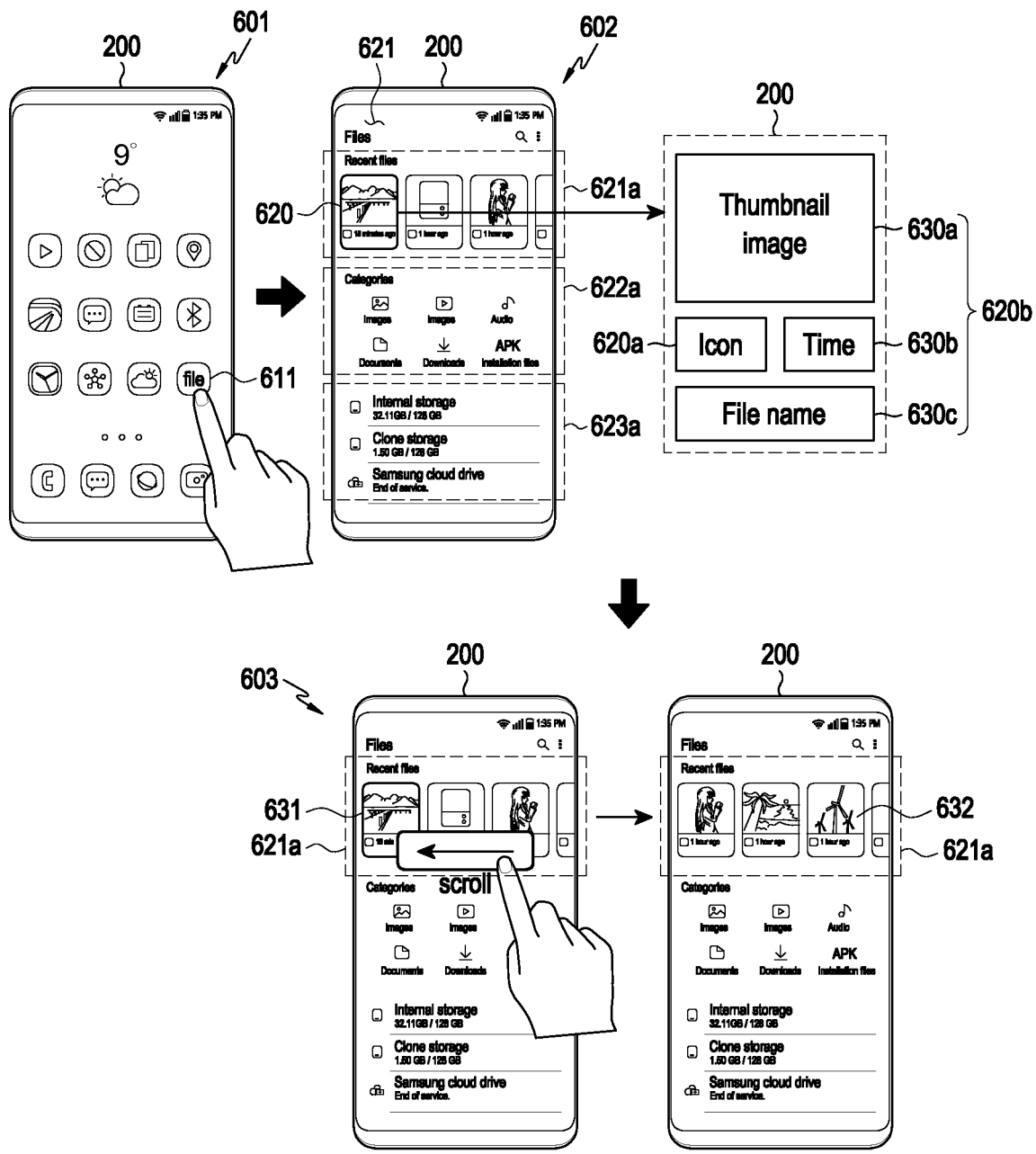
FIG. 6 is a diagram for illustrating an example of an operation of displaying an execution screen including file information (e.g., a thumbnail, a name, and time) on at least some of multiple files of the electronic device and an icon for indicating sources of at least some of the multiple files, according to various embodiments.

FIG. 6 is a diagram for illustrating an example of an operation of displaying an execution screen including file information (e.g., a thumbnail, a name, and time) on at least some of multiple files of the electronic device 200 and icons for indication of sources of at least some of the multiple files, according to various embodiments.

According to various embodiments, in operation 501, the electronic device 200 may store, in the memory 340, multiple files acquired based on execution of multiple applications which are different each other, and first information on the multiple files. For example, as described with reference to FIG. 3 and FIG. 4, the electronic device 200 (e.g., the file storage/management module 351) may store, in the memory 340, multiple files acquired based on execution of multiple applications and may store, in the memory 340, the file database 400 including source information and additional information on the multiple files. The source information of the file may include information on identification information (e.g., an application package name) of an application (or program) used to acquire the file, but may further include various types of information for identification of the source of the file, without being limited to the description. In addition, the additional information of the file may include information on at least one of a logical path via which the file is stored, a downlink link (e.g., a uniform resource indicator (URI)) of the file, a web path link from which the file has been retrieved, or a region (e.g., a region in which the file has been acquired) associated with the file, and may include various types of information associated with the file, other than the source of the file, without being limited to the description.

According to various embodiments, the electronic device 200 may execute a first application in operation 503. For example, as illustrated in 601 of FIG. 6, the electronic device 200 may execute a file application 611 (e.g., the first application), based on reception (e.g., reception of an input for selecting an icon corresponding to a file icon) of an input for execution of the file application 611 (e.g., the first application). The file application 611 may be an application (or program) implemented to manage multiple files stored in the electronic device 200. In addition to the file application 611 described above, an operation of the electronic device 200 may be performed based on an application (e.g., a gallery application, etc.) implemented to provide a service associated with the multiple files stored in the electronic device 200.

According to various embodiments, the file application 611 (e.g., the first application) may be configured to include at least one of an authority or function (e.g., API) to use and/or access the file database 400 stored in the memory 340. For example, the file application 611 may be configured to use a media store API as a function for accessing a media provider database (e.g., the file database 400). In addition to the file application 611 described above, as an application (e.g., a gallery application, etc.) implemented to provide a service associated with the multiple files stored in the electronic device 200 is configured to include at least one of an authority or function (e.g., API) to use and/or access the file database 400, an operation of the electronic device 200, which is based on the application (e.g., a gallery application, etc.) other than the file application 611, may be performed.

According to various embodiments, in operation 505, the electronic device 200 may display a first execution screen of the executed first application, based on at least a part of information on the multiple applications, which is included in information on the multiple files. For example, as illustrated in 602 of FIG. 6, the electronic device 200 may display a home screen 621 (e.g., the first execution screen) of the file application 611 (e.g., the first application), based on execution of the file application 611 (e.g., the first application). A partial area (e.g., a recent area 621a to be described later) of the home screen 621 may include file description information 620 including source indication information 620a and file information 620b for at least some of the multiple files. For example, the home screen 621 may include a first area (e.g., the recent area 621a) implemented to provide information on files that are most recently stored (or acquired) (e.g., within a specified time from a current time point), a second area 622a implemented to provide a service for calling and/or managing files for each category (e.g., image, video, audio, document, downloads, and installation file), and a third area 623a implemented to provide information on a storage area (e.g., amount being used) of the memory 340. Without being limited to the description, the first area 621a may be implemented to provide the file description information 620 stored at a specific time (e.g., a time interval configured by a user) in addition to within the specified time from a current time point. The file description information 620 may be provided in the first area 621a. For example, the electronic device 200 may identify at least some files stored within a specified time from among multiple files, and may display the home screen 621 of the file application 611 including the first area (e.g., the recent area 621a) including the file information 620b on the identified at least some files and the source indication information 620a of the identified at least some files. In this case, as illustrated in 603 of FIG. 6, the electronic device 200 may display file description information 631 (e.g., the file information 620b and the source indication information 620a) of a specified number of files from among at least some files stored in the specified time in the first area (e.g., the recent area 621a), and when a user's input (e.g., a scroll input) for screen switching is received in the first area 621a, the electronic device 200 may sequentially display file description information 632 (e.g., the file information 620b and the source indication information 620a) of the remaining files. The sequential displaying may be performed in order from the most recently acquired file to the oldest acquired file. Without being limited to the description, in addition to the home screen 621 of the file application 611, the file information 620b and the source indication information 620a may be provided as described above, on other screens of the file application 611.

According to various embodiments, referring to 602 of FIG. 6, the file information 620b may include at least one of a thumbnail image 630a of a file, information on an acquisition time 630b (or a storing time) of the file (e.g., hour/second/day/month/year), or a file name 630c, and may include various types of information (e.g., a storage path of the file and a file type) enabling file recognition by a user, without being limited to the description.

According to various embodiments, referring to 602 of FIG. 6, the source indication information 620a may include information associated with the source of the file, which enables recognition of the source (e.g., an application (or program)) used to acquire the file. The information associated with the sources of the files may include icons indicating the sources, and may include various types of information enabling recognition of the sources of the files by a user, without being limited to the description. The icon may include an icon of an application used to acquire the file. When the icon is selected, implementation may be performed to provide a specified function (e.g., an application screen display function or an alignment function), which will be described later.

Hereinafter, examples of operations of the electronic device 200 according to various embodiments will be described. In the operation (e.g., the operation of a flowchart 700 of FIG. 7) of the electronic device 200 to be described below, the aforementioned description of the operation (e.g., the operation of a flowchart 500 of FIG. 5) of the electronic device 200 may be applied, so that a redundant description will be omitted.

According to various embodiments, the electronic device 200 may display, in a partial area of the execution screen of the file application 611, the file information 620*b* (e.g., a thumbnail, time, and a name) and the source indication information 620*a* (e.g., an icon), based on information of a specific file in the file database 400 stored in the memory 340.

Figure 7:
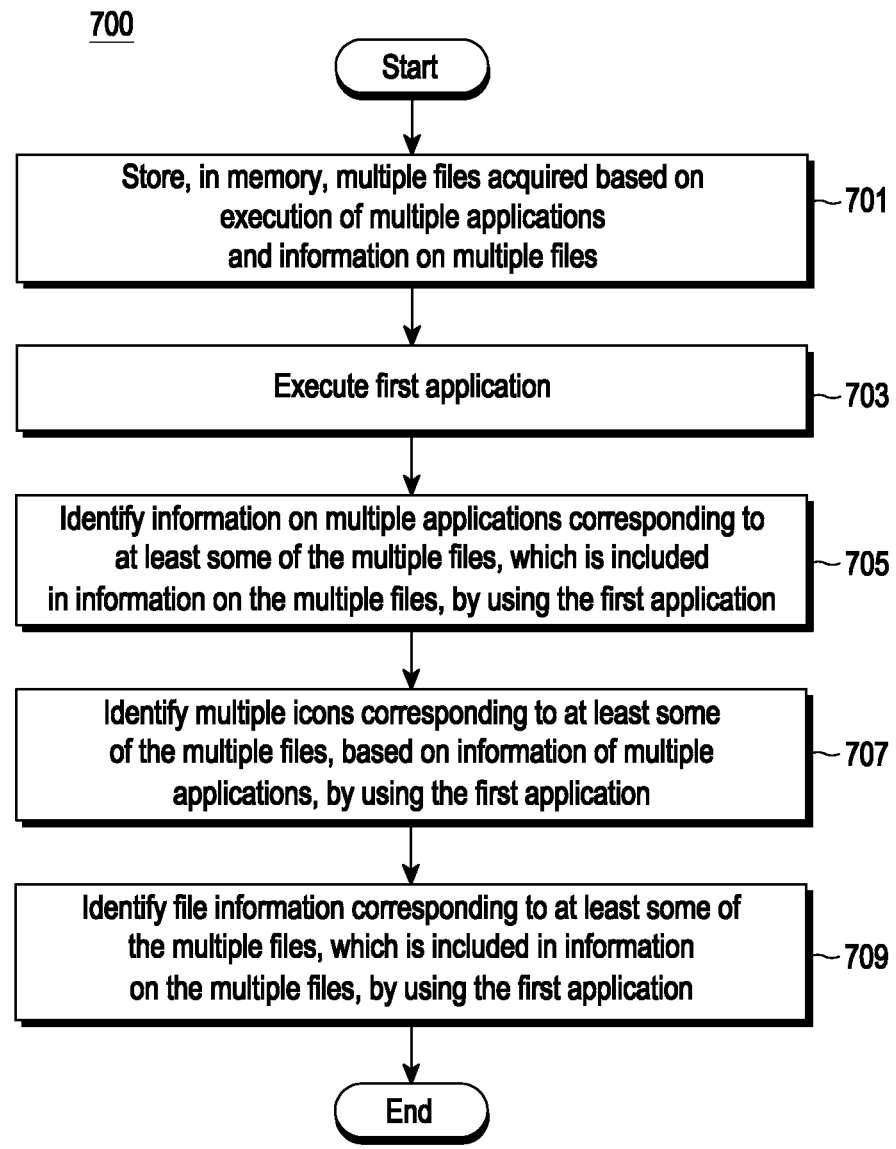
FIG. 7 is a flowchart for illustrating an example of an operation of the electronic device according to various embodiments.

FIG. 7 is a flowchart 700 for illustrating an example of an operation of the electronic device 200 according to various embodiments. According to various embodiments, the operations illustrated in FIG. 7 are not limited to the illustrated order and may be performed in various orders. According to various embodiments, more operations or at least one fewer operation than those illustrated in FIG. 7 may be performed. Hereinafter, FIG. 7 will be described with reference to FIG. 8.

Figure 8:
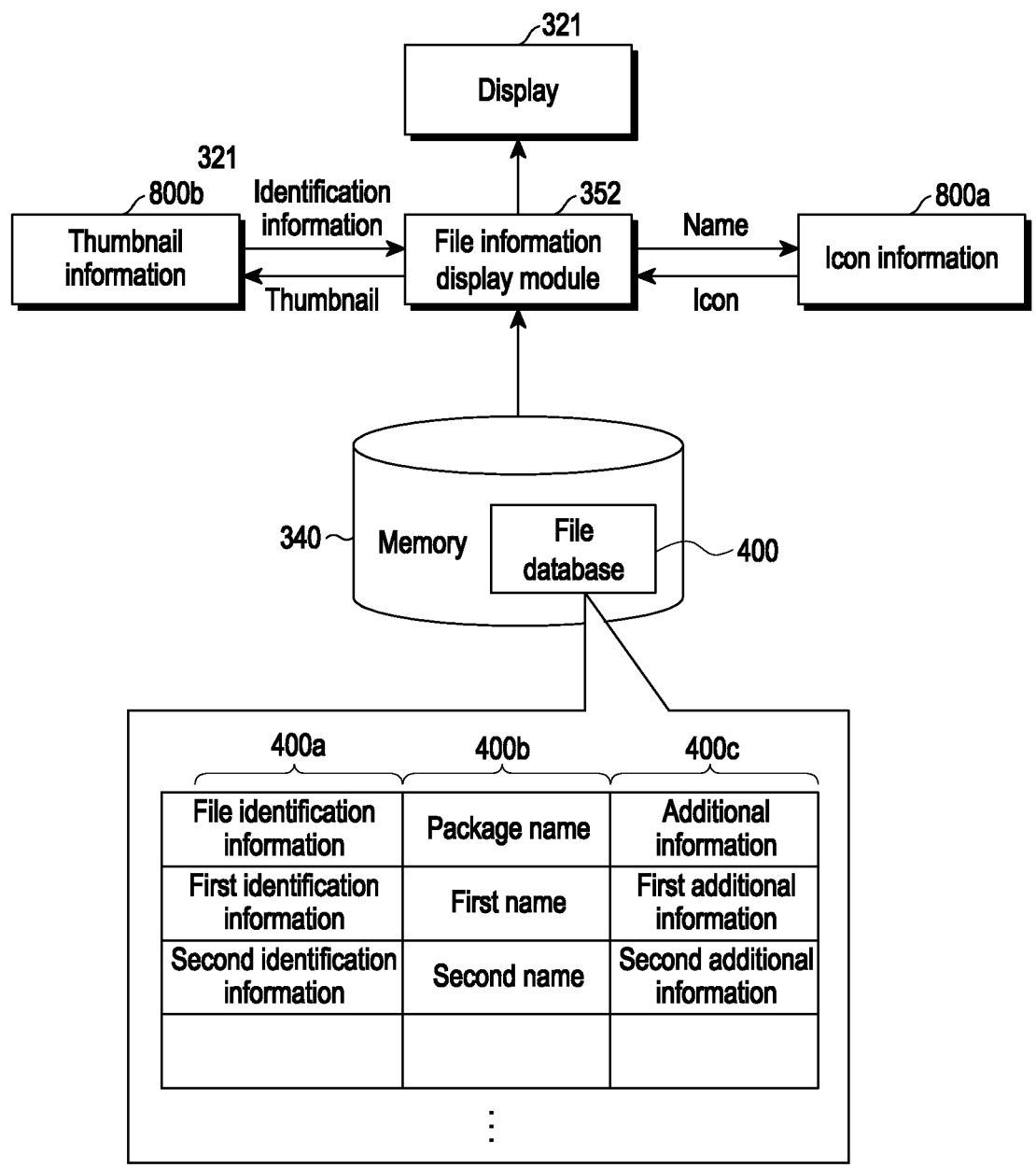
FIG. 8 is a diagram for illustrating an example of an operation of displaying file information (e.g., a thumbnail, time, and a name) and source indication information (e.g., an icon), based on information of a specific file in a file database stored in a memory of the electronic device according to various embodiments.

FIG. 8 is a diagram for illustrating an example of an operation of displaying the file information 620*b* (e.g., a thumbnail, time, and a name) and the source indication information 620*a* (e.g., an icon), based on information of a specific file in the file database 400 stored in the memory 340 of the electronic device 200 according to various embodiments.

According to various embodiments, in operation 701, the electronic device 200 may store, in the memory 340, multiple files acquired based on execution of multiple applications, and information on the multiple files. For example, the electronic device 200 (e.g., the file storage/management module 351) may store, in the memory 340, multiple files acquired based on execution of multiple applications and may store, in the memory 340, the file database 400 including source information (e.g., an application package name) and additional information (e.g., information on at least one of a logical path via which the file is stored, a downlink link (e.g., a download uniform resource identifier (URI)) of the file, a web path link from which the file has been retrieved, a chat room link, or a region associated with the file (e.g., a region in which the file has been acquired)) of the multiple files. Since operation 701 of the electronic device 200 may be performed as in aforementioned operation 501 of the electronic device 200, a redundant description will be omitted.

According to various embodiments, the electronic device 200 may execute a first application in operation 703. For example, the electronic device 200 may execute the file application 611 (e.g., the first application). In addition to the file application 611 described above, an operation of the electronic device 200 may be performed based on an application (e.g., a gallery application, etc.) implemented to provide a service associated with multiple files stored in the electronic device 200.

According to various embodiments, in operation 705, the electronic device 200 may identify information on multiple applications corresponding to at least some of the multiple files, which is included in information on the multiple files, by using the first application. For example, the file application 611 (e.g., the first application) may be configured to include at least one of an authority or function to use and/or access the file database 400, as described above. As illustrated in FIG. 8, the electronic device 200 may access the file database 400, based on the file application 611, and may acquire the source information 400*b* of at least some (e.g., files within a specified time from a current time point from among multiple files stored in the memory 340) of the multiple files from the file database 400. The source information 400*b* indicates multiple applications used to acquire at least some of the multiple files, and may include, for example, application package names as described above. As at least a part of the operation of acquiring the source information 400*b*, the electronic device 200 may acquire the source information 400*b* from column information of a file identifier 400*a* corresponding to the icon of the file database 400, by using the at least one of the authority or function for accessing the file database 400 of the file application (e.g., the first application).

According to various embodiments, in operation 707, the electronic device 200 may identify multiple icons corresponding to at least some of the multiple files, based on information of multiple applications, by using the first application. For example, as illustrated in FIG. 8, based on pre-stored information (e.g., icon information 800*a*) on multiple icons corresponding to multiple applications, the electronic device 200 may identify multiple icons (e.g., the source indication information 620*a*) corresponding to the source information 400*b* of at least some of the identified multiple files by using the file application 611 (e.g., the first application). The pre-stored icon information 800*a* may include multiple icon images stored in a form associated with (or corresponding to) multiple pieces of the source information 400*b* (e.g., multiple application package names). Accordingly, the electronic device 200 may identify multiple icons corresponding to the source information 400*b* (e.g., application package names) corresponding to at least some of multiple applications from among the multiple icon images included in the icon information 800*a*.

According to various embodiments, in operation 709, the electronic device 200 may identify file information 620*b* corresponding to at least some of the multiple files, which is included in information on the multiple files, by using the first application. In an embodiment, the electronic device 200 may identify the file information 620*b* (e.g., a file name and an acquisition time (or storing time)) to be displayed, from the additional information 400*c* corresponding to at least some (e.g., files within a specified time from a current time point among the multiple files stored in the memory 340) of identified multiple files included in the file database 400 by using the file application 611 (e.g., the first application). In another embodiment, the electronic device 200 may identify thumbnail images corresponding to the at least some of the multiple files from among thumbnail images (e.g., thumbnail information 800*b*) of pre-stored respective multiple files, by using the file application 611 (e.g., the first application). The electronic device 200 may use the at least one of the authority or function for accessing the file database 400 of the file application (e.g., the first application) so as to acquire the additional information 400*c* from column information of the file identifier 400*a* corresponding to the icon of the file database 400 and to acquire the file information 620*b* for displaying of the file description information 620 from the additional information 400*c*.

According to various embodiments, in operation 711, the electronic device 200 may display an execution screen of the first application, which includes multiple icons corresponding to at least some of the multiple files and multiple thumbnails corresponding to at least some of the multiple files. For example, the electronic device 200 may display the execution screen of the file application 611, which includes multiple icons and multiple pieces of the file information 620b. Since operation 711 of the electronic device 200 may be performed as in operation 505 of the electronic device 200, a redundant description will be omitted.

Hereinafter, examples of operations of the electronic device 200 according to various embodiments will be described. In the operation (e.g., the operation of a flowchart 900 of FIG. 9) of the electronic device 200 to be described below, the aforementioned description of the operation (e.g., the operation of the flowchart 500 of FIG. 5 and/or the operation of the flowchart 700 of FIG. 7) of the electronic device 200 may be applied, so that a redundant description will be omitted.

According to various embodiments, when storing a file, the electronic device 200 may store a specific type of additional information according to a type of a source (e.g., an application type), from which the file has been acquired. When the displayed source information 620a (e.g., an icon) is selected by a user, the electronic device 200 may perform at least one function (or at least one operation). The at least one function may include an application screen display function and an alignment function. Each function will be described later.

Figure 9:
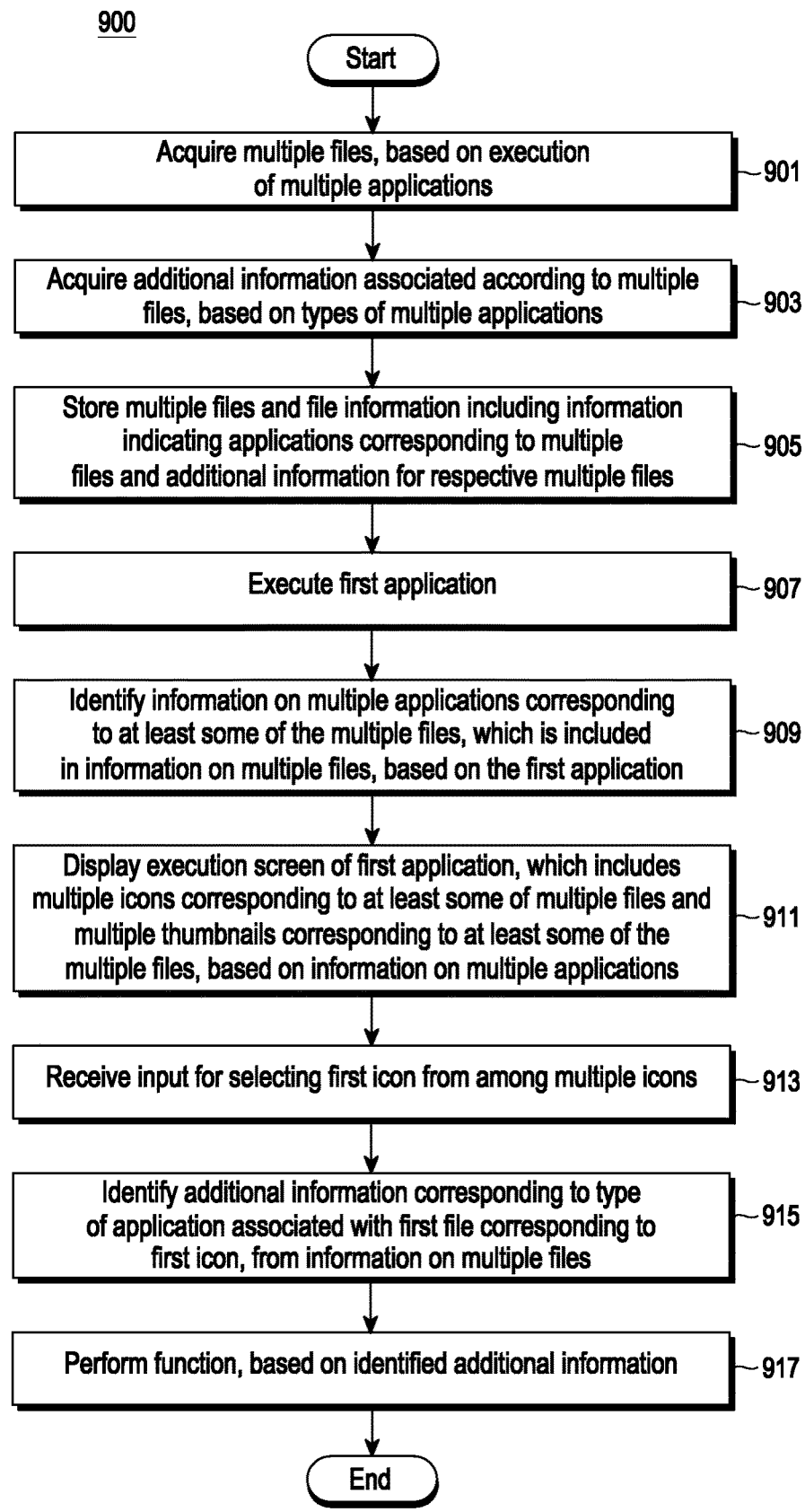
FIG. 9 is a flowchart for illustrating an example of an operation of the electronic device according to various embodiments.

FIG. 9 is a flowchart 900 for illustrating an example of an operation of the electronic device 200 according to various embodiments. According to various embodiments, the operations illustrated in FIG. 9 are not limited to the illustrated order and may be performed in various orders. According to various embodiments, more operations or at least one fewer operation than those illustrated in FIG. 9 may be performed. Hereinafter, FIG. 9 will be described with reference to FIG. 10A and FIG. 10B.

Figure 10A:
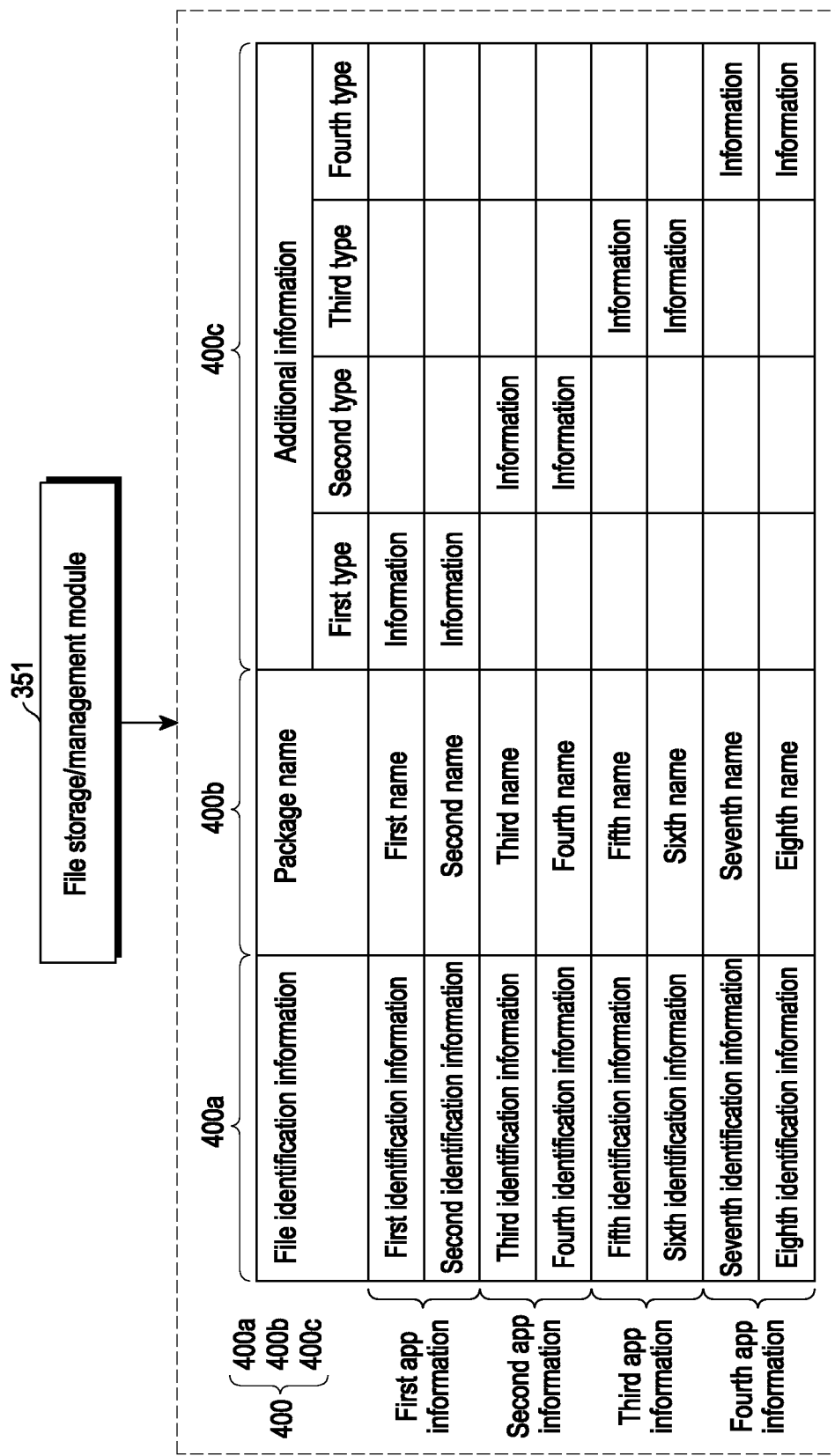
FIG. 10A is a diagram for illustrating an example of an operation of storing a specific type of additional information according to a type of an application of the electronic device according to various embodiments.
Figure 10B:
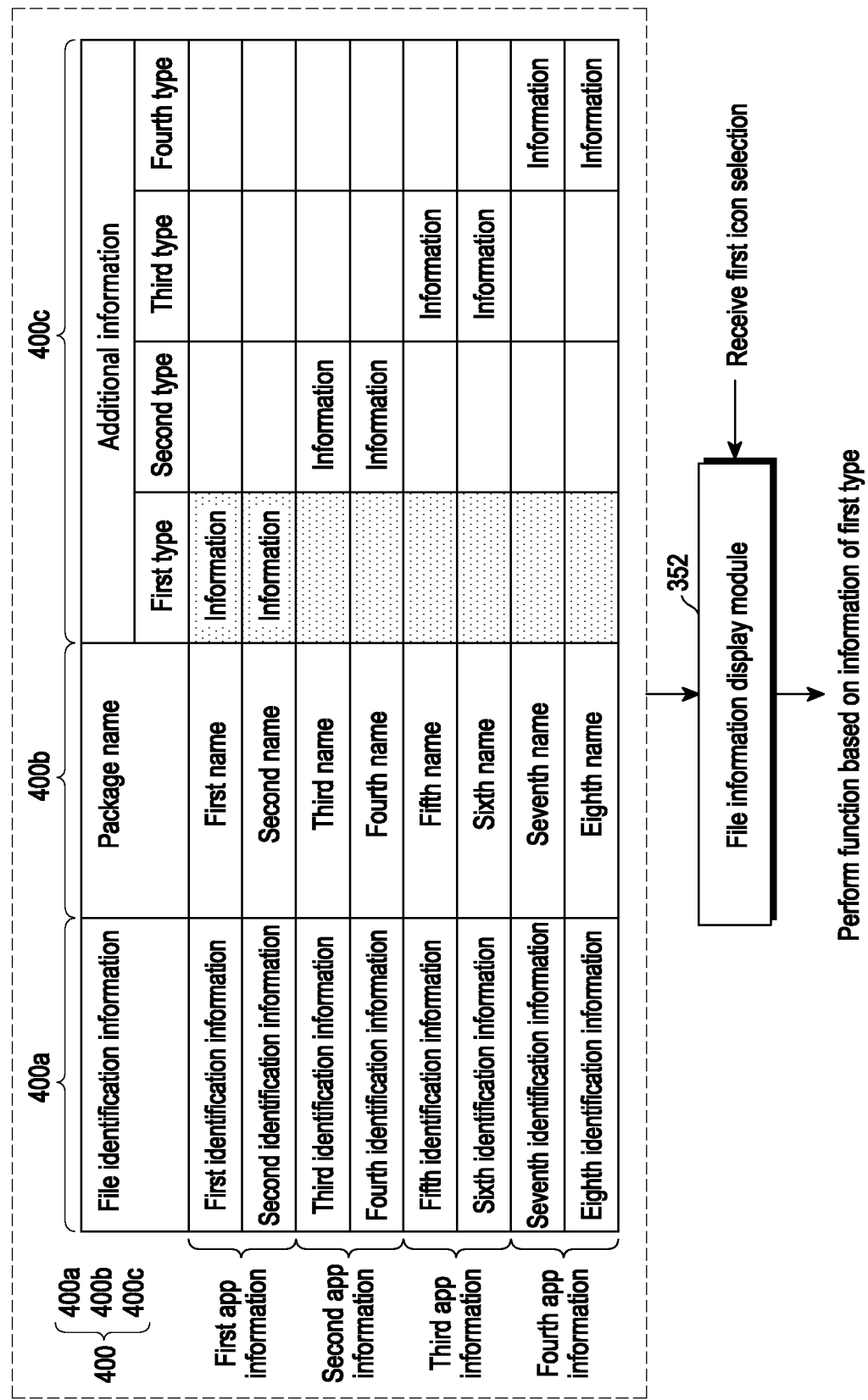
FIG. 10B is a diagram for illustrating an example of an operation of providing a function corresponding to a selected icon of the electronic device according to various embodiments.

FIG. 10A is a diagram for illustrating an example of an operation of storing a specific type of additional information according to a type of an application of the electronic device 200 according to various embodiments. FIG. 10B is a diagram for illustrating an example of an operation of providing a function corresponding to a selected icon of the electronic device 200 according to various embodiments.

According to various embodiments, in operation 901, the electronic device 200 may acquire multiple files, based on execution of multiple applications. For example, the electronic device 200 (e.g., the file storage/management module 351) may acquire multiple files, based on execution of multiple applications. As described above, the multiple applications may be classified by type. For example, a type of the application may include a web application type, a messenger application type including a message application and a social network service (SNS), a camera application type, and an email application type, but is not limited to the aforementioned types, and applications may be classified into more types.

According to various embodiments, the electronic device 200 may acquire additional information associated with the respective multiple files in operation 903, based on types of the multiple applications, and may store, in operation 905, the multiple files and file information (e.g., the file database 400) including information indicating the applications corresponding to the multiple files and the additional information for the respective multiple files. For example, as illustrated in FIG. 10A, the electronic device 200 may store, in advance, the file database 400 including the identification information 400a of the acquired respective multiple files, the source information 400b (e.g., package names), and the additional information 400c of specific types (e.g., a first type, a second type, a third type, and a fourth type) corresponding to the application types (e.g., a first app type, a second app type, a third app type, and a fourth app type). In an embodiment, when a file is acquired using an application corresponding to the web application type, the electronic device 200 (e.g., the file storage/management module 351) may acquire, as additional information of the file, a downlink of the file and/or a reference link of the file. In another embodiment, when a file is acquired using an application corresponding to the messenger application type, the electronic device 200 (e.g., the file storage/management module 351) may acquire, as additional information of the file, a link to a chat room in which the file has been acquired, and/or identification information (e.g., a name, contact information, and an ID) of another user having transmitted the file. In another embodiment, when a file is acquired using an application corresponding to the camera application type, the electronic device 200 (e.g., the file storage/management module 351) may acquire, as additional information of the file, information on a region in which the file has been acquired. In an embodiment, when a file is acquired using an application corresponding to the email application type, the electronic device 200 (e.g., the file storage/management module 351) may acquire, as additional information of the file, information on a link of a mail, to which the file is attached, or a mail address of a counterpart of the mail.

According to various embodiments, the electronic device 200 may execute a first application in operation 907. For example, the electronic device 200 may execute the file application 611 (e.g., the first application).

According to various embodiments, the electronic device 200 may identify information on multiple applications corresponding to the at least some of the multiple files, which is included in information on the multiple files, in operation 909, based on the first application, and may display an execution screen of the first application, which includes multiple icons corresponding to the at least some of the multiple files and multiple thumbnails corresponding to the at least some of the multiple files, in operation 911, based on the information on the multiple applications. For example, as described above, the electronic device 200 may display the home screen 621 of the file application 611 (e.g., the file information 620b display module 352), which includes the file information 620b (e.g., thumbnails, file names, and acquisition times (or storing times)) associated with at least some (e.g., files within a specified period from a current time point) of the multiple files and the source indication information 620a (e.g., icons) indicating sources of the at least some files.

According to various embodiments, the electronic device 200 may receive an input for selecting a first icon from among the multiple icons in operation 913. For example, the electronic device 200 may receive a user's input for selecting a specific icon (e.g., a first icon) from among the multiple icons corresponding to the at least some of the multiple files, which are displayed in a partial area (e.g., the aforementioned recent area 621a) of the home screen 621 of the file application 611.

According to various embodiments, the electronic device 200 may identify, in operation 915, additional information corresponding to a type of an application associated with a first file corresponding to the first icon from information on the multiple files, and may perform a function based on the identified additional information in operation 917. For example, referring to FIG. 10B, the electronic device 200 (e.g., the file information 620b display module 352) may receive information (e.g., icon identification information) on a specific icon (e.g., the first icon) selected by a user, and may perform at least one function, based on additional information of a specific type (e.g., a first type) corresponding to a type (e.g., a first app type) of an application corresponding to the specific icon. The electronic device 200 (e.g., the file information 620*b* display module 352) may identify, as at least a part of the operation of identifying additional information of the specific type corresponding to the specific icon, an application package name of a file corresponding to the specific icon and may identify a type of the application corresponding to the identified package name.

In an embodiment, the electronic device 200 may perform an application screen display function, based on a user's input for selecting a specific icon (e.g., a first icon). For example, the electronic device 200 may execute an application associated with a specific icon (e.g., a first icon) and may display an execution screen of the executed application, based on additional information of a specific type (e.g., a first type) of a file corresponding to the specific icon. The electronic device 200 may identify a package name of the file corresponding to the specific icon, as at least a part of an operation of executing the application corresponding to the specific icon (e.g., a first icon), may identify an application of the identified package name from among multiple applications installed in the electronic device 200, and may execute the identified application. The package name of the file corresponding to the specific icon may be a package name of an application used to acquire the file. In addition, without being limited to the description, the package name may be a package name of an application (e.g., a map application corresponding to a media file to be described later) of a type differing from that of the application used to acquire the file. The electronic device 200 may, as at least a part of the operation of displaying, based on the additional information, the execution screen of the executed application, identify predetermined link information (e.g., URI) described as the additional information and display the execution screen of the executed application corresponding to the identified link information, instead of the aforementioned home screen 621 of the file application 611. An example of the operation of displaying the execution screen of the application of the electronic device 200 will be described in detail later.

In another embodiment, the electronic device 200 may perform an alignment function, based on a user's input for selecting a specific icon (e.g., a first icon). For example, the electronic device 200 may classify files corresponding to a type (e.g., a first app type) of an application corresponding to a specific icon (e.g., a first icon) from among multiple files stored in the electronic device 200, based on additional information of a specific type (e.g., a first type) corresponding to the type (e.g., the first app type) of the application, and may display an execution screen of the file application 611, which includes a classified result. An example of the operation of displaying the execution screen of the file application 611, which includes a classified result, by the electronic device 200 will be described in detail later.

According to various embodiments, the electronic device 200 may provide at least one of the aforementioned functions (e.g., the application screen display function and the alignment function), based on a configuration of a user. For example, when a specific icon is selected on the home screen 621 of the file application 611 according to a configuration of a user, the electronic device 200 may be implemented (or configured) in advance to perform a specific function (e.g., the application screen display function or the alignment function) among the aforementioned functions. The electronic device 200 may provide (e.g., display an object for activation of a specific function), as a configuration menu of the file application 611, a menu for selection of a function to be performed when the icon is selected from among the functions (e.g., the application screen display function and the alignment function), and may identify a specific function to be performed, based on a user's input on the menu. In addition, without being limited to the description, the aforementioned functions (e.g., the application screen display function and the alignment function) may all be performed sequentially.

Hereinafter, examples of operations of the electronic device 200 according to various embodiments will be described. In the operation (e.g., the operation of a flowchart 1100 of FIG. 11) of the electronic device 200 to be described below, the aforementioned description of the operation (e.g., the operation of the flowchart 500 of FIG. 5, the operation of the flowchart 700 of FIG. 7, and/or the operation of the flowchart 900 of FIG. 9) of the electronic device 200 may be applied, so that a redundant description will be omitted.

According to various embodiments, the electronic device 200 may, based on selection of a specific icon from among icons indicating sources of files, which are displayed on the home screen 621 of the file application 611, execute an application corresponding to the specific icon, and display an execution screen of the executed application, based on link information of a file corresponding to the specific icon.

Figure 11:
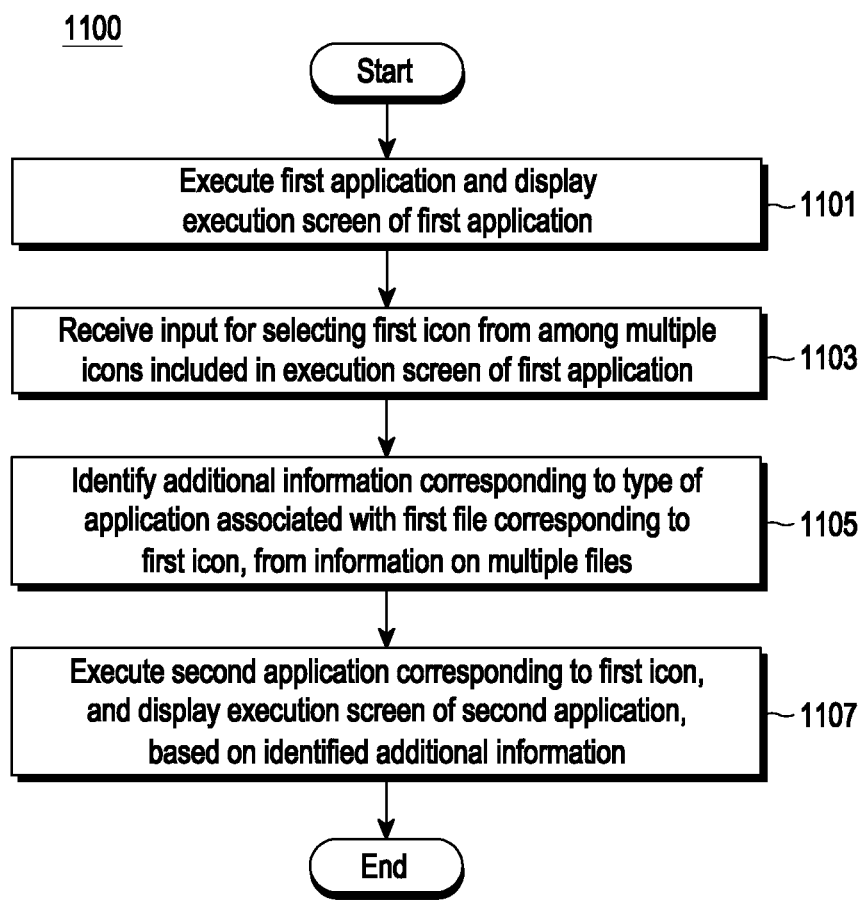
FIG. 11 is a flowchart for illustrating an example of an operation of the electronic device according to various embodiments.

FIG. 11 is a flowchart 1100 for illustrating an example of an operation of the electronic device 200 according to various embodiments. According to various embodiments, the operations illustrated in FIG. 11 are not limited to the illustrated order and may be performed in various orders. According to various embodiments, more operations or at least one fewer operation than those illustrated in FIG. 11 may be performed. Hereinafter, FIG. 11 will be described with reference to FIG. 12.

Figure 12:
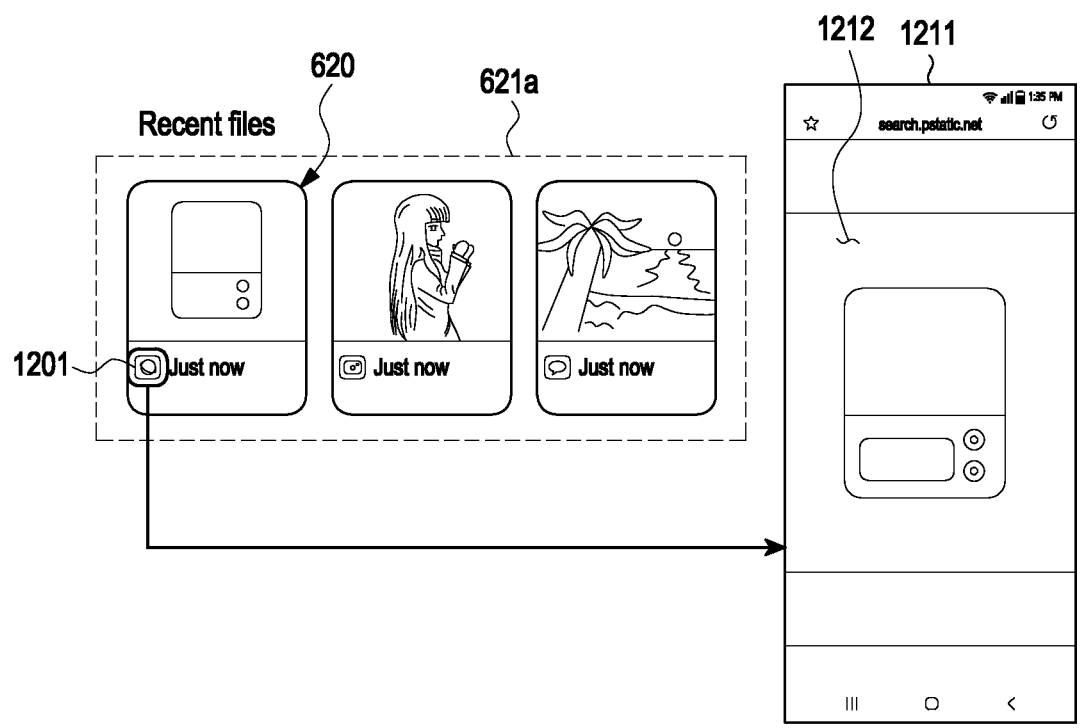
FIG. 12 is a diagram for illustrating an example of an application screen display function of the electronic device according to various embodiments.

FIG. 12 is a diagram for illustrating an example of an application screen display function of the electronic device 200 according to various embodiments.

According to various embodiments, the electronic device 200 may execute a first application and display an execution screen of the first application in operation 1101, and may receive, in operation 1103, an input for selecting a first icon among multiple icons included in the execution screen of the first application. For example, the electronic device 200 may display the home screen 621 of the file application 611 (e.g., the first application). As described above, a partial area (e.g., the recent area 621*a*) of the home screen 621 of the file application 611 (e.g., the first application) may include the file description information 620 including the file information 620*b* (e.g., thumbnails, acquisition times (or storing times), and file names) corresponding to at least some (e.g., files acquired within a specified time from a current time point) of multiple files and the source indication information 620*a* (e.g., icons) indicating sources of the at least some files. The electronic device 200 may receive a user's input for selecting a specific icon (e.g., the first icon 1201) indicating a source of a specific file from among the multiple icons displayed on the home screen 621 of the file application 611 (e.g., the first application).

According to various embodiments, the electronic device 200 may identify, in operation 1105, additional information corresponding to a type of an application associated with a first file corresponding to the first icon from information on the multiple files and, in operation 1107, may perform a second application corresponding to the first icon and display an execution screen of the second application, based on the identified additional information. For example, as described above, when the electronic device 200 is implemented (or configured) to perform an application screen display function according to icon selection, the electronic device 200 may execute an application corresponding to a specific icon (e.g., a first icon 1201) as illustrated in FIG. 12, and based on additional information (e.g., link information and position information to be described later) for providing of information associated with a file corresponding to a specific icon identified as additional information, may display an execution screen 1211 of the application, which includes information 1212 associated with the file. Referring to FIG. 12, the execution screen 1211 of the application may include an image based on the file.

According to various embodiments, the electronic device 200 may identify different types of additional information according to application types and may display an execution screen of an application, based on identified additional information. In an embodiment, if an application type corresponding to the specific icon 1201 is a web application, the electronic device 200 may identify, as additional information, a download link of a file corresponding to the specific icon 1201, which is stored in the file database 400, and may display a specific execution screen of the web application, which includes a file image, based on accessing via the download link. In an embodiment, if an application type corresponding to the specific icon 1201 is a messenger application, the electronic device 200 may identify, as additional information, a chat room link of a file corresponding to the specific icon 1201, which is stored in the file database 400, and may display an execution screen of the messenger application, which includes a chat room corresponding to the chat room link. In another embodiment, if an application type corresponding to the specific icon 1201 is a camera application, the electronic device 200 may identify, as additional information, position information of a file corresponding to the specific icon 1201, which is stored in the file database 400, and may display an execution screen of a map application, which includes an object for indicating a position corresponding to the position information. In another embodiment, if an application type corresponding to the specific icon 1201 is a mail application, the electronic device 200 may identify, as additional information, a link of a mail to which a file corresponding to the specific icon 1201 is attached, which is stored in the file database 400, and may display an execution screen of the mail application, which includes a mail writing screen corresponding to the mail link.

Hereinafter, examples of operations of the electronic device 200 according to various embodiments will be described. In the operation (e.g., the operation of the flowchart 1100 of FIG. 11) of the electronic device 200 to be described below, the aforementioned description of the operation (e.g., the operation of the flowchart 500 of FIG. 5, the operation of the flowchart 700 of FIG. 7, the operation of the flowchart 900 of FIG. 9, and/or the operation of the flowchart 1100 of FIG. 11) of the electronic device 200 may be applied, so that a redundant description will be omitted.

According to various embodiments, the electronic device 200 may, based on selection of a specific icon from among icons indicating sources of files, which are displayed on the home screen 621 of the file application 611, execute an application corresponding to the specific icon, and display an execution screen of the executed application, based on link information of a file corresponding to the specific icon.

Figure 13:
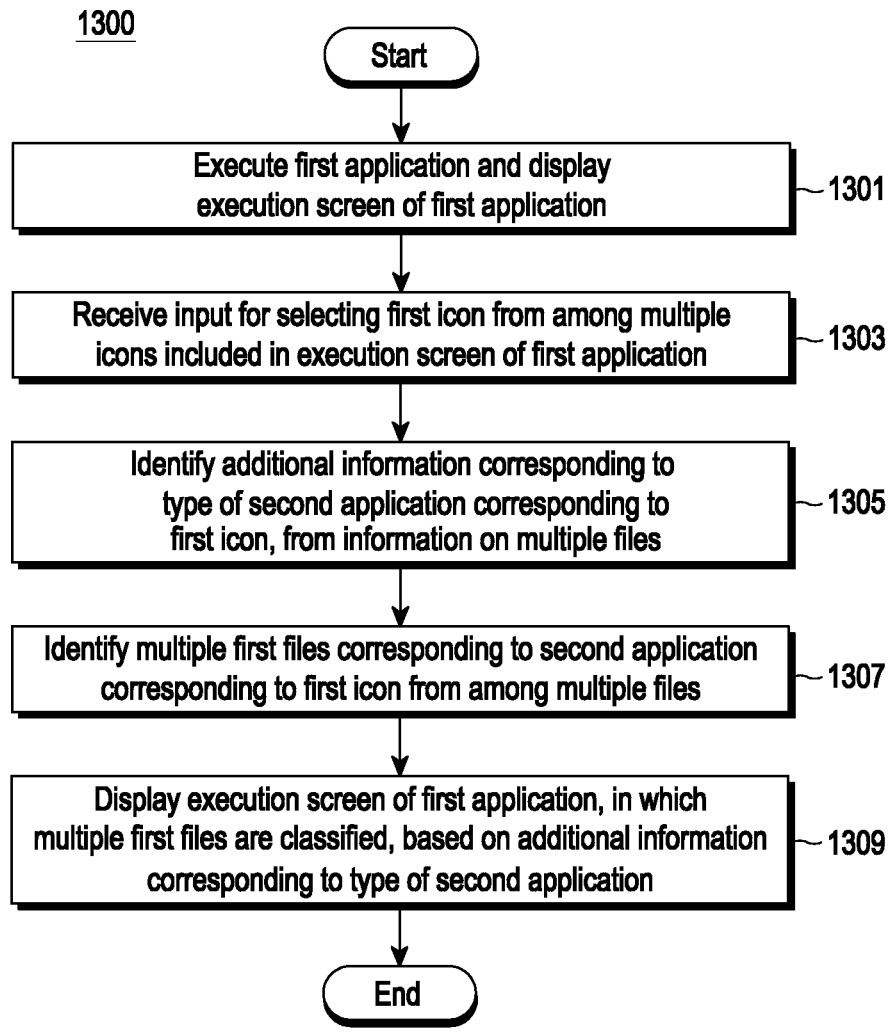
FIG. 13 is a flowchart for illustrating an example of an operation of the electronic device according to various embodiments.

FIG. 13 is a flowchart 1300 for illustrating an example of an operation of the electronic device 200 according to various embodiments. According to various embodiments, the operations illustrated in FIG. 11 are not limited to the illustrated order and may be performed in various orders. According to various embodiments, more operations or at least one fewer operation than those illustrated in FIG. 13 may be performed. Hereinafter, FIG. 13 will be described with reference to FIG. 14.

Figure 14:
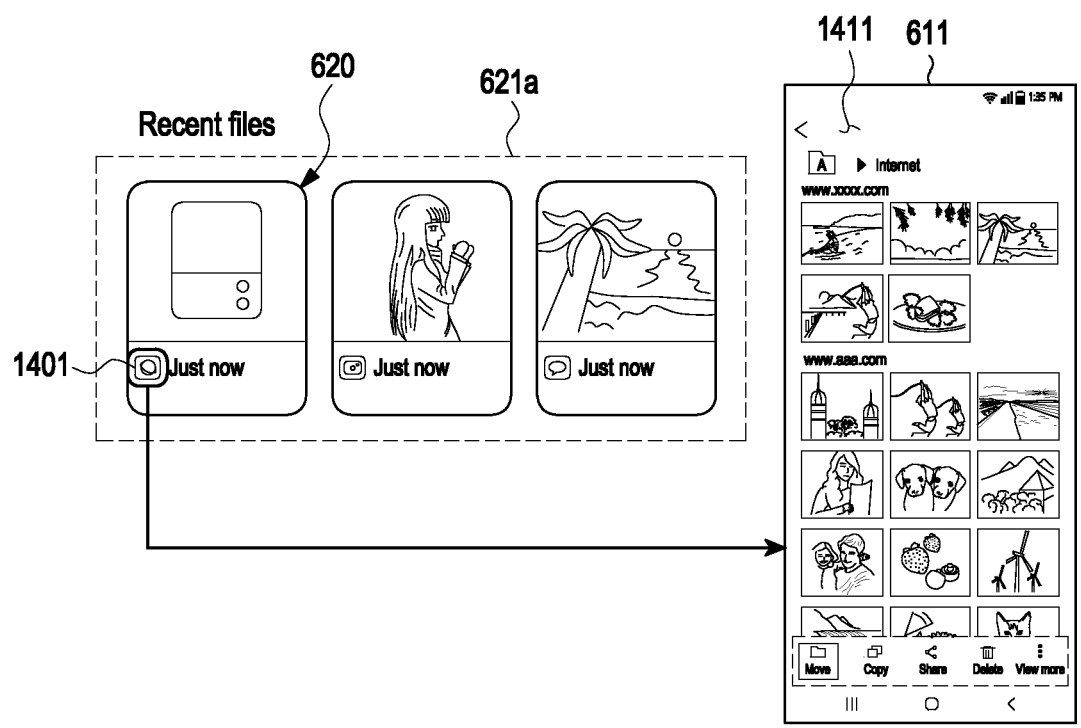
FIG. 14 is a diagram for illustrating an example of an application screen display function of the electronic device according to various embodiments.

FIG. 14 is a diagram for illustrating an example of an application screen display function of the electronic device 200 according to various embodiments.

According to various embodiments, the electronic device 200 may execute a first application and display an execution screen of the first application in operation 1301, and may receive, in operation 1303, an input for selecting a first icon among multiple icons included in the execution screen of the first application. For example, the electronic device 200 may display the home screen 621 of the file application 611 (e.g., the first application). As described above, a partial area (e.g., the recent area 621*a*) of the home screen 621 of the file application 611 (e.g., the first application) may include the file description information 620 including the file information 620*b* (e.g., thumbnails, acquisition times, and file names) corresponding to at least some (e.g., files acquired within a specified time from a current time point) of multiple files and the source indication information 620*a* (e.g., icons) indicating sources of the at least some files. The electronic device 200 may receive a user's input for selecting a specific icon (e.g., the first icon 1401) indicating a source of a specific file from among the multiple icons displayed on the home screen 621 of the file application 611 (e.g., the first application).

According to various embodiments, the electronic device 200 may identify, in operation 1305, additional information corresponding to a type of a second application corresponding to the first icon from information on the multiple files, may identify, in operation 1307, multiple first files corresponding to the second application corresponding to the first icon from among the multiple files, and may display, in operation 1309, the execution screen of the first application, in which the multiple first files are classified, based on the additional information corresponding to the type of the second application. For example, based on additional information (e.g., a reference link, a conversation partner's name, position information, and a mail sender/recipient) associated with a type of an application corresponding to a specific icon 1401 from the file database 400 pre-stored in the electronic device 200, the electronic device 200 may classify files associated with the type of the application corresponding to the specific icon 1401 from among multiple files, and may display an execution screen 1411 of the file application 611, which includes a classified result. Referring to FIG. 14, the execution screen 1411 of the file application 611, which includes the classified result, may include a result screen in which files associated with respective specific types of additional information (e.g., a reference link) are arranged in a form associated with each other. For example, files having a specific reference link may be arranged under the specific reference link on the result screen. That is, the arrangement of files under the specific reference link may refer to that the arranged files are acquired using the specific reference link. Without being limited to the description and/or illustration, the electronic device 200 may, based on selection of the specific icon 1401, execute another application (e.g., a gallery application and a media file application) instead of a first application (e.g., the file application) and provide information on a result of file classification on an execution screen of another application.

According to various embodiments, the electronic device 200 may identify different types of additional information according to application types and may classify files, based on the identified additional information. In an embodiment, if an application type corresponding to the specific icon 1401 is a web application, the electronic device 200 may identify, as additional information, a reference link of a file corresponding to the specific icon 1401, which is stored in the file database 400, and may display an execution screen of the file application 611 in which files are classified based on the reference link. In an embodiment, if an application type corresponding to the specific icon 1401 is a messenger application, the electronic device 200 may identify, as additional information, an identifier (e.g., an ID and a nickname) indicating a conversation partner in a chat room of a file corresponding to the specific icon 1401, which is stored in the file database 400, and may display an execution screen of the file application 611 in which files are classified based on the identifier. In another embodiment, if an application type corresponding to the specific icon 1401 is a camera application, the electronic device 200 may identify, as additional information, position information of a file corresponding to the specific icon 1401, which is stored in the file database 400, and may display an execution screen of the file application 611 in which files are classified based on the position information. In another embodiment, if an application type corresponding to the specific icon 1401 is a mail application, the electronic device 200 may identify, as additional information, an identifier (e.g., an ID and a mail address) indicating a sender/recipient of a mail to which a file corresponding to the specific icon 1401 is attached, which is stored in the file database 400, and may display an execution screen of the file application 611 in which files are classified based on the sender/recipient.

According to various embodiments, the electronic device 200 may provide a function for editing the files classified on the execution screen of the file application 611 in which the files have been classified. For example, the function for editing may include at least one of changing a file name, moving a file, deleting a file, or sharing a file. For example, the execution screen of the file application 611, in which the files are classified, may include at least one object 1412 for execution of the function for editing. When a specific object is selected from at least one object 1412 on the execution screen, the electronic device 200 may perform an editing function corresponding to the selected specific object.

Hereinafter, examples of operations of the electronic device 200 according to various embodiments will be described. In the operation (e.g., the operation of the flowchart 1100 of FIG. 11) of the electronic device 200 to be described below, the aforementioned description of the operation (e.g., the operation of the flowchart 500 of FIG. 5, the operation of the flowchart 700 of FIG. 7, the operation of the flowchart 900 of FIG. 9, the operation of the flowchart 1100 of FIG. 11, and/or the operation of the flowchart 1300 of FIG. 13) of the electronic device 200 may be applied, so that a redundant description will be omitted.

According to various embodiments, the electronic device 200 may, based on selection of a specific icon from among icons indicating sources of files, which are displayed on the home screen 621 of the file application 611, execute an application corresponding to the specific icon, and display an execution screen of the executed application, based on link information of a file corresponding to the specific icon.

Figure 15:
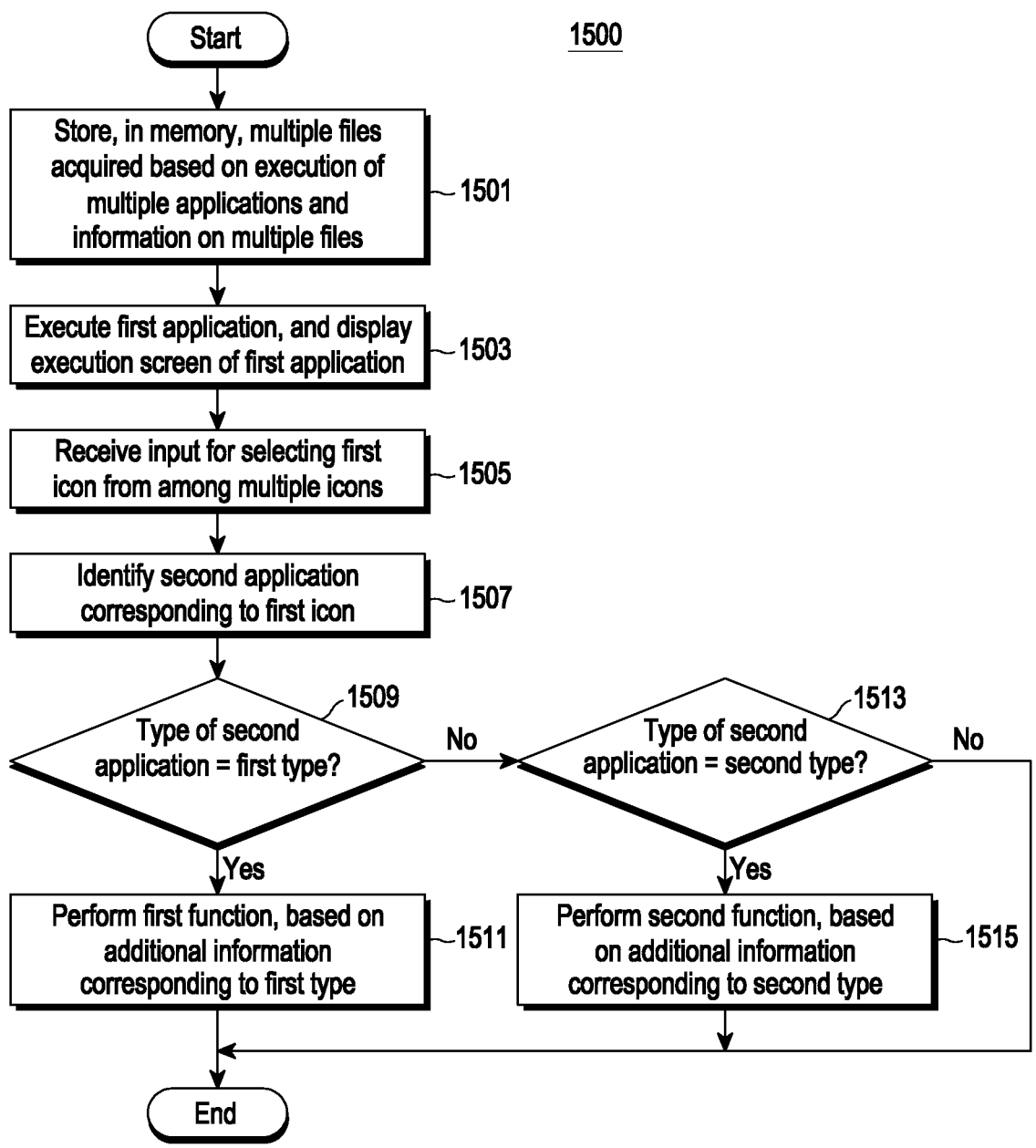
FIG. 15 is a flowchart for illustrating an example of an operation of the electronic device according to various embodiments.

FIG. 15 is a flowchart 1500 for illustrating an example of an operation of the electronic device 200 according to various embodiments. According to various embodiments, the operations illustrated in FIG. 11 are not limited to the illustrated order and may be performed in various orders. According to various embodiments, more operations or at least one fewer operation than those illustrated in FIG. 15 may be performed. Hereinafter, FIG. 15 will be described with reference to FIG. 16.

Figure 16A:
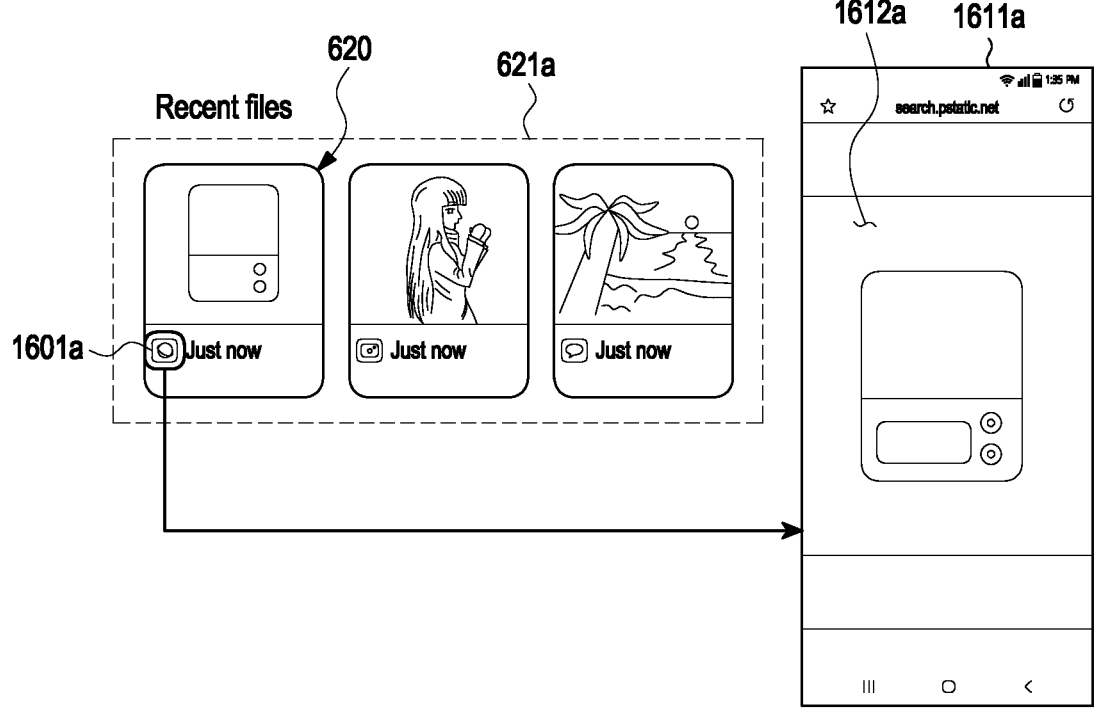
FIG. 16A is a diagram for illustrating an example of performing an application screen display function when an icon corresponding to a web application of the electronic device is selected, according to various embodiments.
Figure 16B:
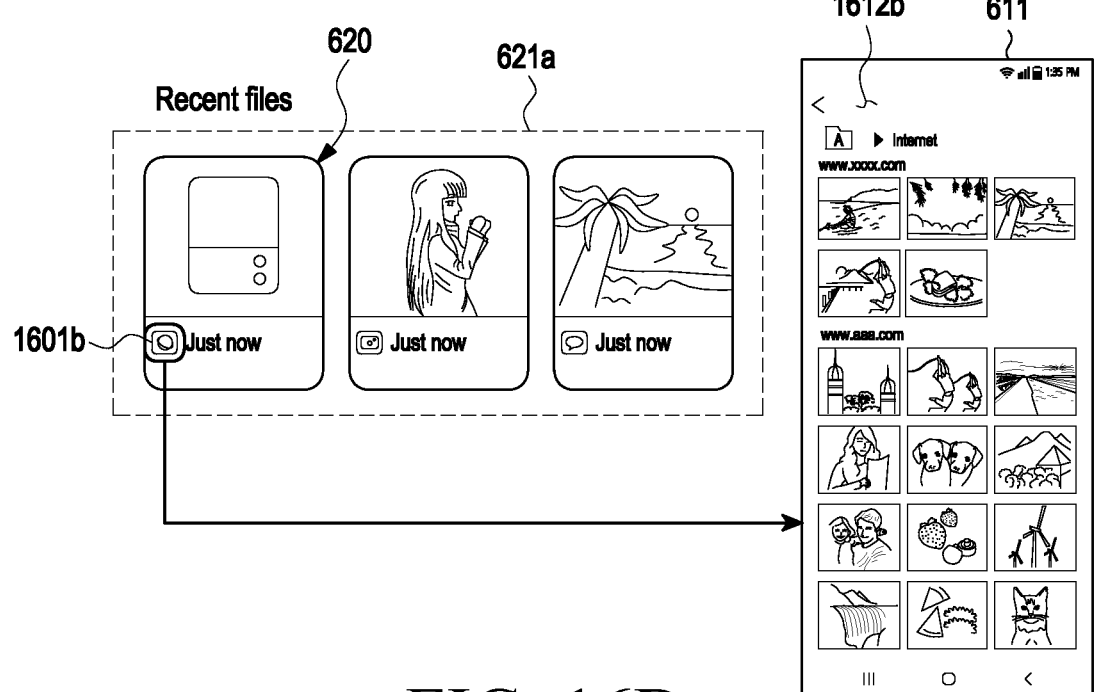
FIG. 16B is a diagram for illustrating an example of performing an alignment function when an icon corresponding to the web application of the electronic device is selected, according to various embodiments.
Figure 17A:
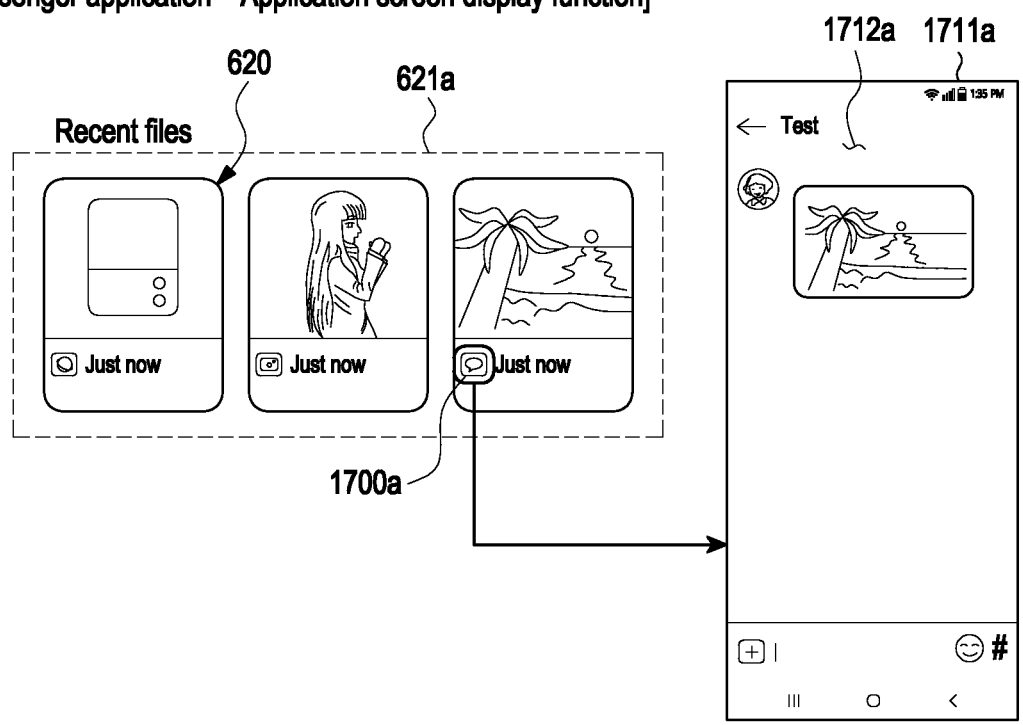
FIG. 17A is a diagram for illustrating an example of performing an application screen display function when an icon corresponding to a messenger application of the electronic device is selected, according to various embodiments.
Figure 17B:
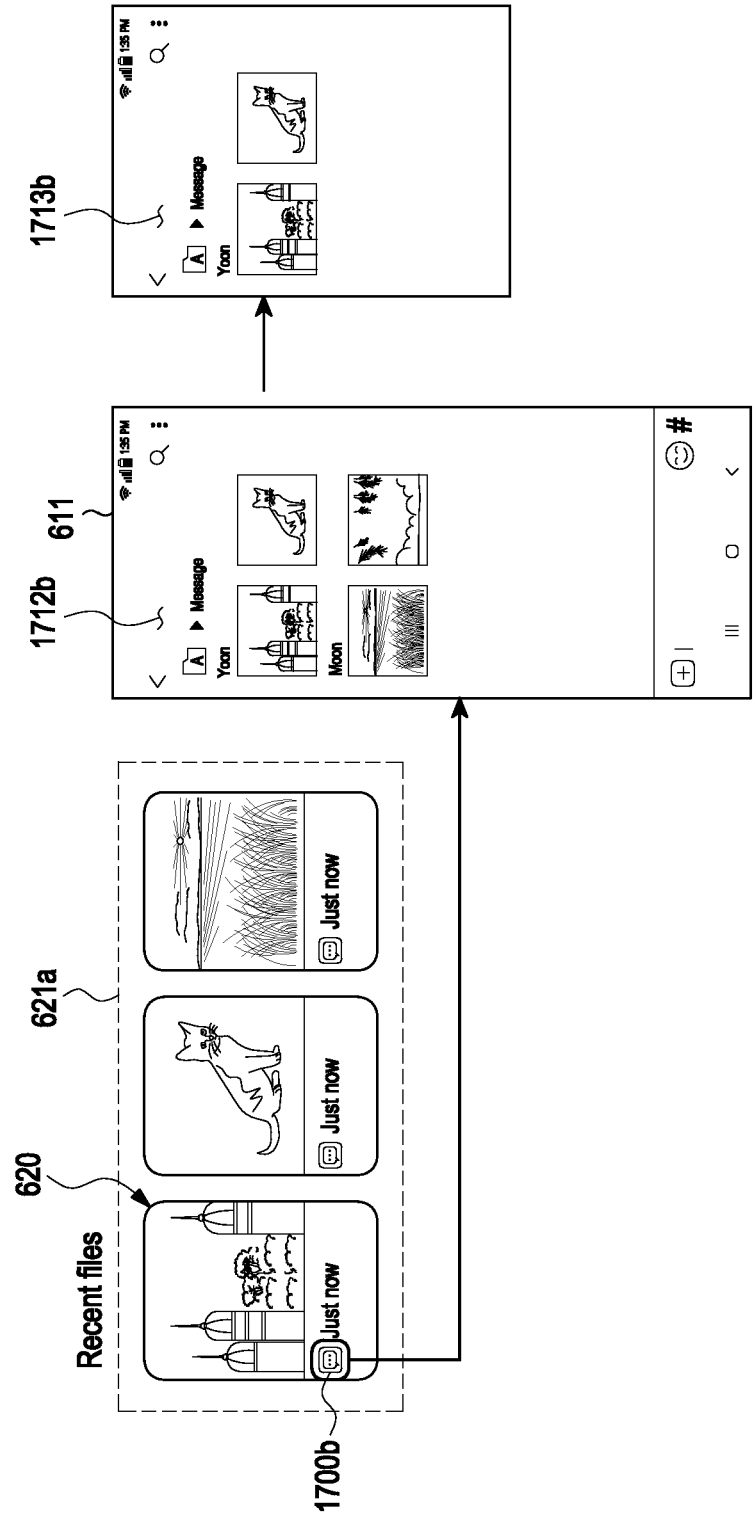
FIG. 17B is a diagram for illustrating an example of performing an alignment function when an icon corresponding to the messenger application of the electronic device is selected, according to various embodiments.
Figure 18A:
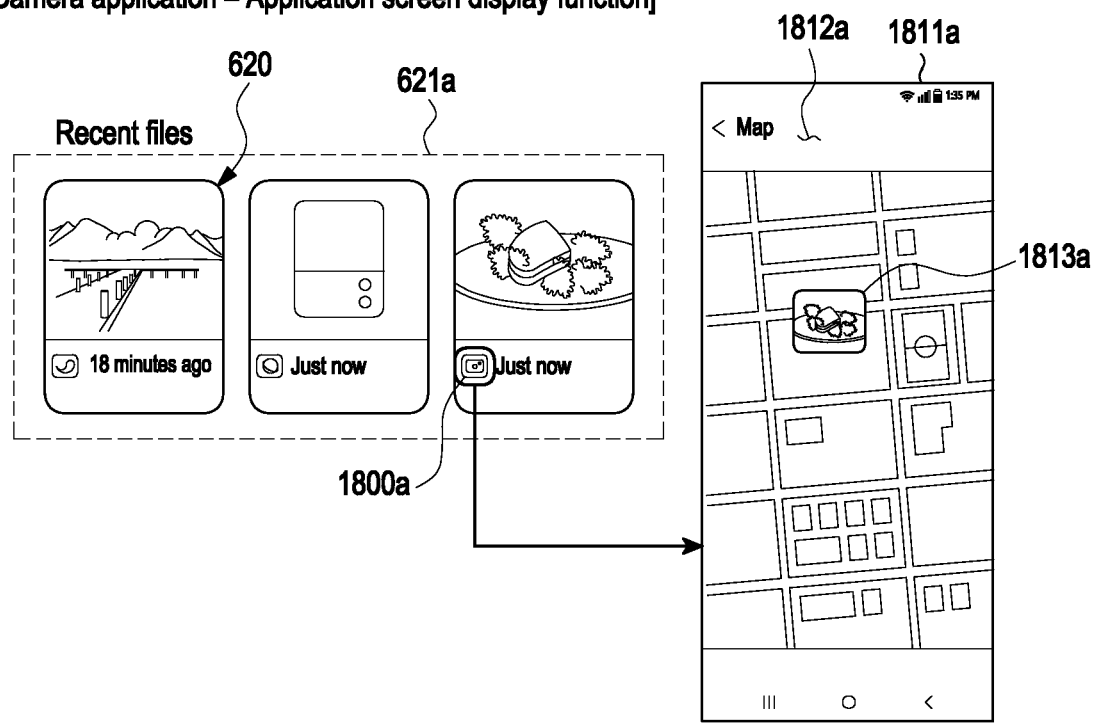
FIG. 18A is a diagram for illustrating an example of performing an application screen display function when an icon corresponding to a camera application of the electronic device is selected, according to various embodiments.
Figure 18B:
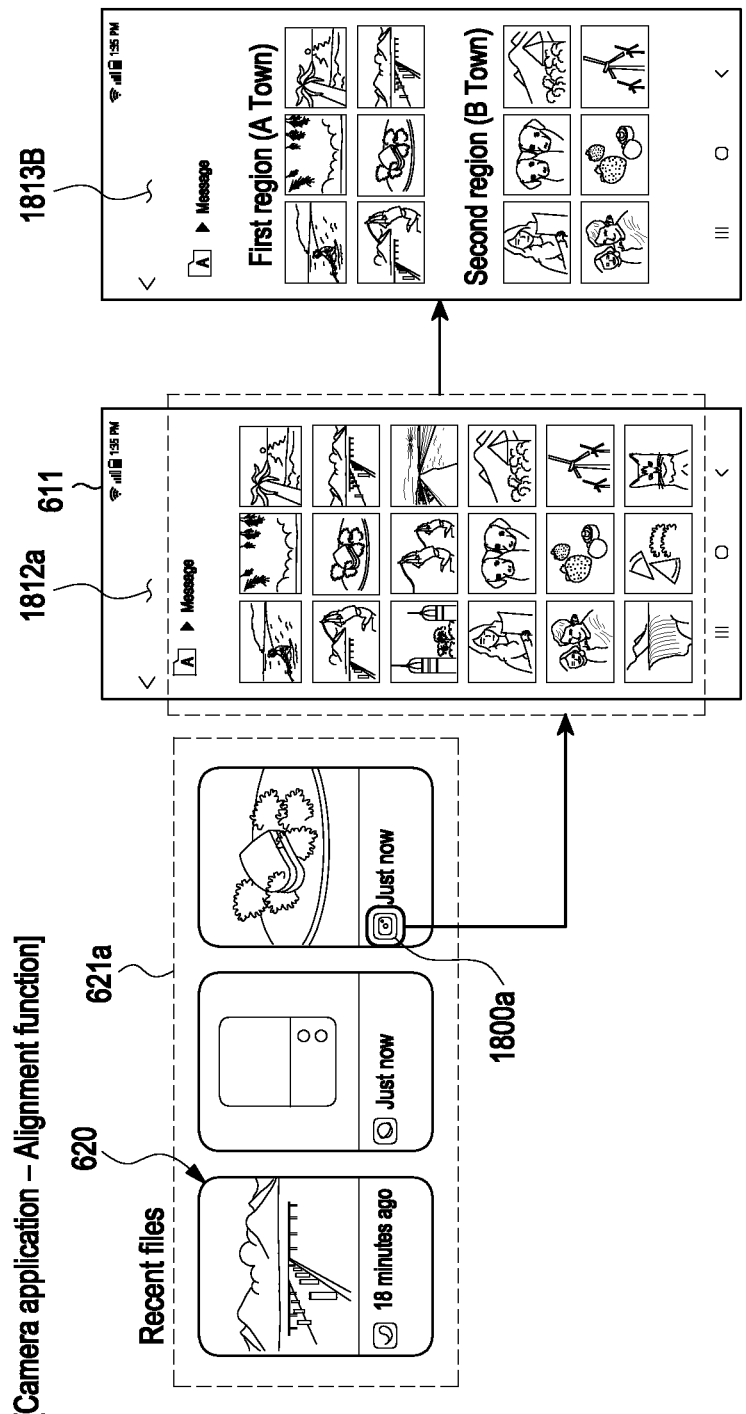
FIG. 18B is a diagram for illustrating an example of performing an alignment function when an icon corresponding to the camera application of the electronic device is selected, according to various embodiments.
Figure 19A:
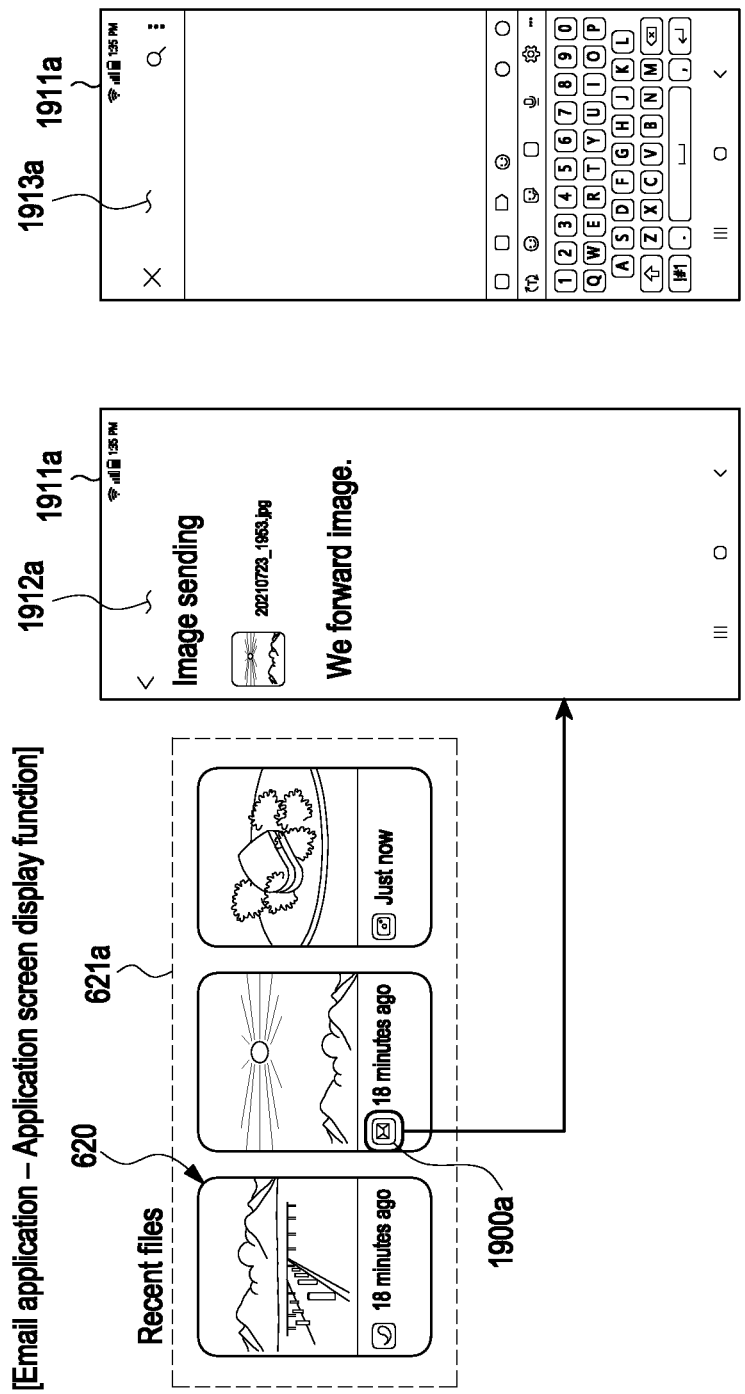
FIG. 19A is a diagram for illustrating an example of performing an application screen display function when an icon corresponding to an email application of the electronic device is selected, according to various embodiments.
Figure 19B:
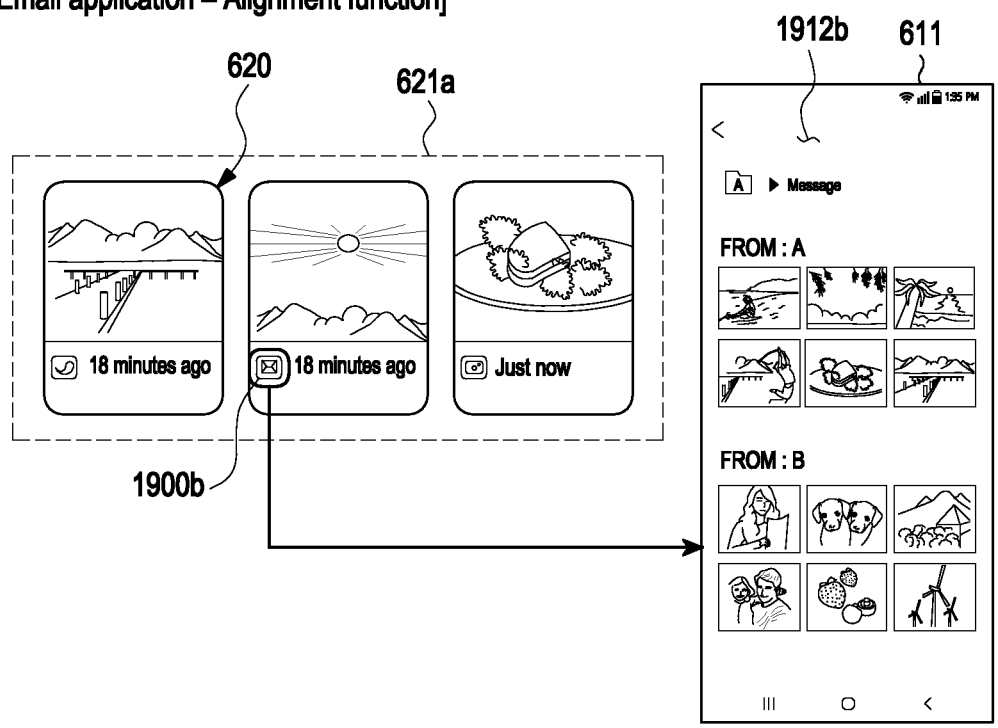
FIG. 19B is a diagram for illustrating an example of performing an alignment function when an icon corresponding to the email application of the electronic device is selected, according to various embodiments.

FIG. 16A is a diagram for illustrating an example of performing an application screen display function when an icon corresponding to a web application of the electronic device is selected, according to various embodiments. FIG. 16B is a diagram for illustrating an example of performing an alignment function when an icon corresponding to the web application of the electronic device is selected, according to various embodiments. FIG. 17A is a diagram for illustrating an example of performing an application screen display function when an icon corresponding to a messenger application of the electronic device is selected, according to various embodiments. FIG. 17B is a diagram for illustrating an example of performing an alignment function when an icon corresponding to the messenger application of the electronic device is selected, according to various embodiments. FIG. 18A is a diagram for illustrating an example of performing an application screen display function when an icon corresponding to a camera application of the electronic device is selected, according to various embodiments. FIG. 18B is a diagram for illustrating an example of performing an alignment function when an icon corresponding to the camera application of the electronic device is selected, according to various embodiments. FIG. 19A is a diagram for illustrating an example of performing an application screen display function when an icon corresponding to an email application of the electronic device is selected, according to various embodiments. FIG. 19B is a diagram for illustrating an example of performing an alignment function when an icon corresponding to the email application of the electronic device is selected, according to various embodiments.

According to various embodiments, in operation 1501, the electronic device 200 may store, in the memory 340, multiple files acquired based on execution of multiple applications, and information on the multiple files. For example, the electronic device 200 (e.g., the file storage/management module 351) may store, in the memory 340, multiple files acquired based on execution of multiple applications and may store, in the memory 340, the file database 400 including source information (e.g., an application package name) and additional information (e.g., information on at least one of a logical path via which the file is stored, a downlink link (e.g., a download uniform resource identifier (URI)) of the file, a web path link from which the file has been retrieved, a chat room link, or a region associated with the file (e.g., a region in which the file has been acquired)) of the multiple files. Since operation 1501 of the electronic device 200 may be performed as in aforementioned operation 501 of the electronic device 200, a redundant description will be omitted.

According to various embodiments, the electronic device 200 may execute a first application and display an execution screen of the first application in operation 1503, and may receive, in operation 1505, an input for selecting a first icon among multiple icons. For example, based on reception of the input for executing the file application 611 (e.g., the first application), the electronic device 200 may execute the file application 611 (e.g., the first application) and may display the home screen 621 of the file application 611. As described above, a partial area (e.g., the recent area 621*a*) of the home screen 621 of the file application 611 (e.g., the first application) may include the file information 620b (e.g., thumbnails, acquisition times, and file names) corresponding to at least some (e.g., files acquired within a specified time from a current time point) of multiple files and the source information 620a (e.g., icons) indicating sources of the at least some files. The electronic device 200 may receive a user's input for selecting a specific icon (e.g., the first icon) indicating an source of a specific file from among the multiple icons displayed on the home screen 621 of the file application 611 (e.g., the first application).

According to various embodiments, the electronic device 200 may identify a second application corresponding to the first icon, in operation 1507. For example, the electronic device 200 may identify an application package name corresponding to the selected icon from the file database 400 and identify an application corresponding to the identified application package name. As described above, the application may include at least one application of a web application type, a messenger application type including a message application and a social network service (SNS), a camera application type, or an email application type.

According to various embodiments, the electronic device 200 may determine in operation 1509 whether a type of the identified second application is a first type, and if the type of the second application is the first type (if YES in operation 1509), the electronic device 200 may perform a first function, based on additional information corresponding to the first type in operation 1511. According to various embodiments, if the type of the second application is not the first type (if NO in operation 1509), the electronic device 200 may determine in operation 1513 whether the type of the identified second application is a second type, and if the type of the second application is the second type (if YES in operation 1513), the electronic device 200 may perform a second function, based on additional information corresponding to the second type in operation 1515. For example, the electronic device 200 may display at least one of the aforementioned application screen display function (e.g., the first function) or alignment function (e.g., the second function), based on additional information of different types according to an application type corresponding to a selected specific icon. Hereinafter, with reference to FIG. 16, FIG. 17, FIG. 18, and FIG. 19, various embodiments of performing at least one of an application screen display function (e.g., a first function) or an alignment function (e.g., a second function) of the electronic device 200 will be described.

According to various embodiments, referring to FIG. 16A and FIG. 16B, if an application type corresponding to a selected icon 1601a or 1601b is a web application, the electronic device 200 may perform at least one of an application screen display function (e.g., a first function) or an alignment function (e.g., a second function), based on link information (e.g., a download link and a reference link). For example, referring to FIG. 16A, when the specific icon 1601a indicating the web application is selected, the electronic device 200 may execute the web application and access a download link of a file corresponding to the specific icon 1601a, which is included in the file database 400, thereby displaying an execution screen 1611a of the web application, which includes an image 1612a of the file. For example, referring to FIG. 16B, when the specific icon 1601b indicating the web application is selected, the electronic device 200 may classify multiple files acquired by the web application corresponding to an application package name corresponding to the specific icon 1601b, based on reference links for the respective multiple files, which are included in the file database 400. The electronic device 200 may display, based on a result of the classification, an execution screen 1612b of the file application 611, in which the files associated (e.g., having corresponding reference links) with the respective reference links are arranged.

According to various embodiments, referring to FIG. 17A and FIG. 17B, if an application type corresponding to a selected icon 1700a or 1700b is a messenger application (e.g., an SNS application and a message application), the electronic device 200 may perform an application screen display function (e.g., a first function), based on link information (e.g., a chat room link), or may perform an alignment function (e.g., a second function), based on an identifier of a conversation partner of the chat room. For example, referring to FIG. 17A, when the specific icon 1700a indicating the messenger application is selected, the electronic device 200 may execute the messenger application and access a chat room link of a chat room, in which a file corresponding to the specific icon has been acquired, which is included in the file database 400, thereby displaying an execution screen 1711a of the messenger application, which includes the chat room 1712a in which the file has been acquired. For example, referring to FIG. 17B, when the specific icon 1700b indicating the messenger application is selected, the electronic device 200 may classify multiple files acquired by the messenger application corresponding to an application package name corresponding to the specific icon 1700b, based on identifiers of conversation partners in chat rooms (or identifiers of chat rooms (e.g., chat room names)) or message senders/recipients for the respective multiple files, which are included in the file database 400. The electronic device 200 may display, based on a result of the classification, an execution screen 1712b of the file application 611, in which the files associated (e.g., having corresponding reference links) according to senders/recipients or identifiers (e.g., IDs, names, numbers, and contact information) of conversation partners in chat rooms are arranged. In this case, based on that the file application 611 receives information from an application (e.g., a contact information application) which manages contact information, the electronic device 200 may determine whether the execution screen 1712b includes a specific transmitter/recipient or an identifier of a specific conversation partner. For example, if a specific user (e.g., Moon) from the contact information application is a user blocked by a user of the electronic device 200, the electronic device 200 may display an execution screen 1713b of the file application 611, from which information on files of the specific user (e.g., Moon) has been excluded.

According to various embodiments, referring to FIG. 18A and FIG. 18B, if an application type corresponding to a selected icon 1800a or 1800b is a camera application, the electronic device 200 may perform at least one of an application screen display function (e.g., a first function) or an alignment function (e.g., a second function), based on position information (e.g., GPS/GNSS information). For example, referring to FIG. 18A, when the specific icon 1800a indicating the camera application is selected, the electronic device 200 may execute a map application configured to be associated with the camera application and may display an execution screen 1811a of the map application, which includes a map 1812a including an object 1813a indicating a position corresponding to position (e.g., GPS/GNSS information) associated with a file corresponding to the specific icon 1800a, which is included in the file database 400. For example, referring to FIG. 18B, when the specific icon 1800b indicating the camera application is selected, the electronic device 200 may classify multiple files acquired by the camera application, based on position information (e.g., a first region, a second region, and a third region) of the respective multiple files, which is included in the file database 400. The electronic device 200 may display, based on a result of the classification, an execution screen 1812b or 1813b of the file application 611, in which the files associated (e.g., having corresponding reference links) with the respective pieces of position information are arranged. In this case, as illustrated in FIG. 18B if the number of files falls within a specified range as in [Table 1] below, the electronic device 200 may display the execution screen 1812b or 1813b of the file application 611, in which the files are classified according to position information of a specific unit. For example, the electronic device 200 may adjust the unit of the position information for classification, based on the number of the files.

TABLE 1

| Range of the number of files | Position information unit |
|---|---|
| 40 ≤ fourth range < 50 | Town |
| 30 ≤ third range < 40 | County |
| 20 ≤ second range < 30 | City |
| 0 ≤ first range < 20 | State |

The unit of position information may include Town, County, City, and State, as described in [Table 1], without being limited to the description, and may include more types of units. In an embodiment, as illustrated in [Table 1], the electronic device 200 may classify files into position information of smaller units as the number of the files increases. For example, when the number of files falls within the second range, the electronic device 200 may display the execution screen 1812b of the file application, in which the files are classified according to City, and if the number of files falls within the third range that is greater than the second range, the electronic device 200 may display the execution screen 1813b of the file application, in which the files are classified according to Town. In another embodiment, on the contrary, as the number of files increases, the electronic device 200 may classify the files by using position information of a wider unit. According to various embodiments, referring to FIG. 19A and FIG. 19B, if an application type corresponding to a selected icon 1900a or 1900b is a mail application, the electronic device 200 may perform at least one of an application screen display function (e.g., a first function) based on link information of a mail (e.g., a sending mail or a receiving mail) associated (e.g., file attached) with a file corresponding to the selected icon, or an alignment function (e.g., a second function) based on a sending or receiving address of a mail (e.g., a sending mail or a receiving mail) associated with the file (e.g., file attached). For example, referring to FIG. 19A, when the specific icon 1900a indicating the mail application is selected, the electronic device 200 may execute the mail application corresponding to an application package name of a file corresponding to the specific icon 1900a, which is included in the file database 400, and may display an execution screen 1911a of the mail application, based on link information of a mail (e.g., a sending mail or receiving mail) associated with the file corresponding to the specific icon, which is included in the file database 400. For example, as illustrated in FIG. 19A, when the link information of the mail associated with the file is link information of a sending mail, the electronic device 200 may display an execution screen 1912a of the mail application, which is for writing of the mail corresponding to the link information of the sending mail. For example, as illustrated in FIG. 19A, when the link information of the mail associated with the file is link information of a receiving mail, the electronic device 200 may display an execution screen 1913a of the mail application, which is for writing of a reply mail corresponding to the link information of the receiving mail. As another example, referring to FIG. 19B, when the specific icon 1900b indicating the camera application is selected, the electronic device 200 may classify multiple files acquired by the camera application, based on sending addresses or receiving addresses of mails associated with the respective multiple files, which are included in the file database 400. The electronic device 200 may display, based on a result of the classification, an execution screen 1912b of the file application 611, in which the files associated (e.g., having corresponding reference links) with the respective sending addresses or receiving addresses are arranged.

In addition to the types of additional information described with reference to FIG. 16A to FIG. 16D and the operations of performing functions based thereon, it would be obvious to those skilled in the art that the electronic device 200 may perform functions based on more various types of additional information for each application type.

Hereinafter, examples of operations of the electronic device 200 according to various embodiments will be described. In the operation (e.g., the operation of the flowchart 1100 of FIG. 11) of the electronic device 200 to be described below, the aforementioned description of the operation (e.g., the operation of the flowchart 500 of FIG. 5, the operation of the flowchart 700 of FIG. 7, the operation of the flowchart 900 of FIG. 9, the operation of the flowchart 1100 of FIG. 11, the operation of the flowchart 1300 of FIG. 13, and/or the operation of the flowchart 1500 of FIG. 15) of the electronic device 200 may be applied, so that a redundant description will be omitted.

According to various embodiments, the electronic device 200 may provide a filtering function for multiple files stored in the electronic device 200, based on the file application 611 and the file database 400. For example, based on additional information of each of multiple files, which is included in the file database 400, the electronic device 200 may provide a function of searching for some of the multiple files, which have specific additional information selected by a user.

Figure 20:
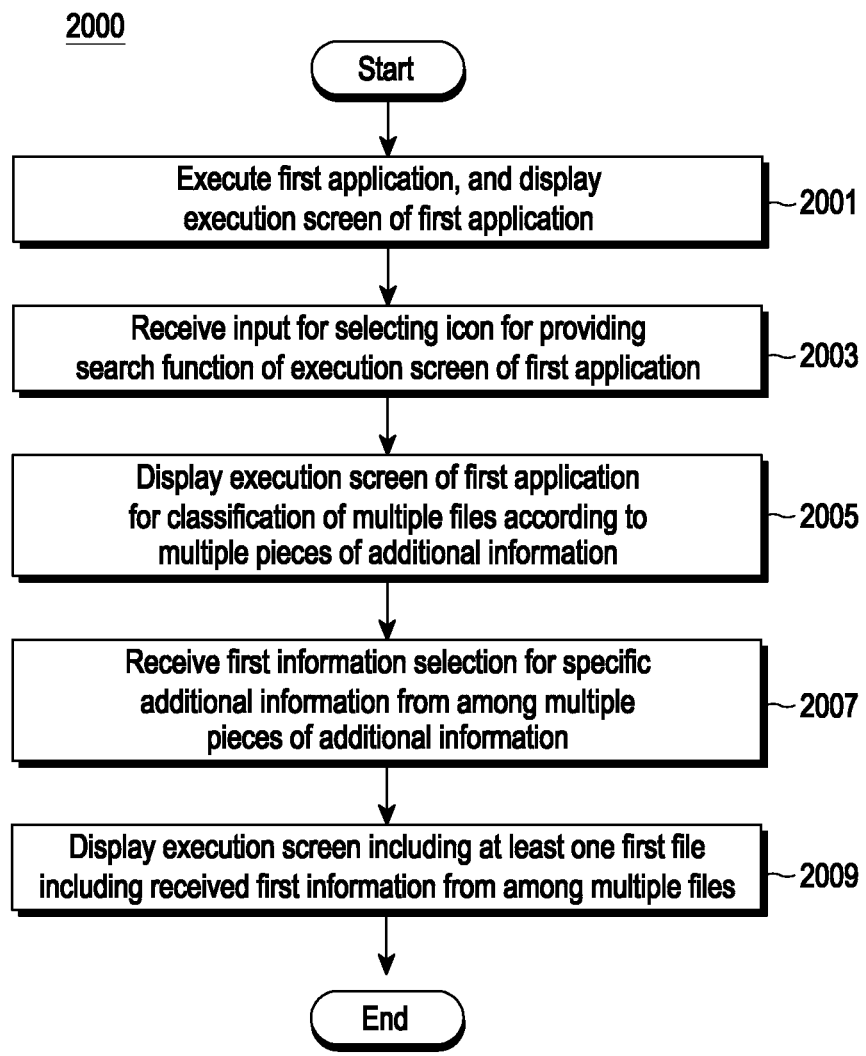
FIG. 20 is a flowchart for illustrating an example of an operation of the electronic device according to various embodiments.

FIG. 20 is a flowchart 2000 for illustrating an example of an operation of the electronic device 200 according to various embodiments. According to various embodiments, the operations illustrated in FIG. 20 are not limited to the illustrated order and may be performed in various orders. According to various embodiments, more operations or at least one fewer operation than those illustrated in FIG. 20 may be performed. Hereinafter, FIG. 20 will be described with reference to FIG. 21.

Figure 21:
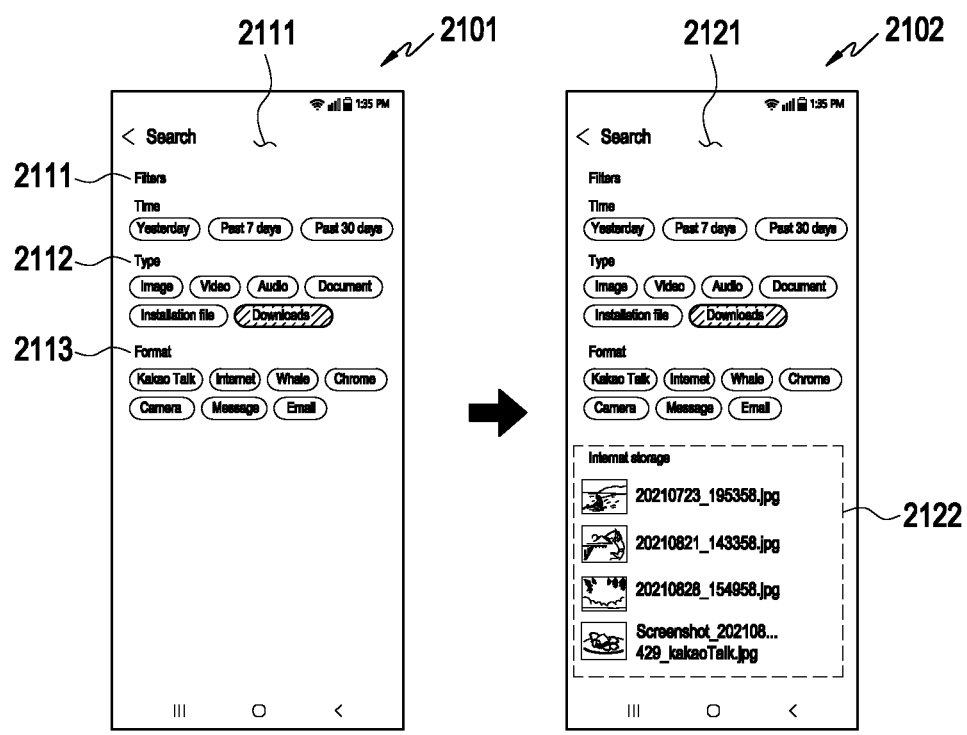
FIG. 21 is a diagram for illustrating an example of an operation of providing a search function for multiple files of the electronic device according to various embodiments.

FIG. 21 is a diagram for illustrating an example of an operation of providing a search function for multiple files of the electronic device 200 according to various embodiments.

According to various embodiments, the electronic device 200 may execute a first application and display an execution screen of the first application in operation 2001, and may receive, in operation 2003, an input for selecting an icon to provide the search function of the execution screen of the first application. For example, based on reception of the input for executing the file application 611 (e.g., the first application), the electronic device 200 may execute the file application 611 (e.g., the first application) and may display an execution screen (e.g., the home screen 621) of the file application 611. Although not illustrated, the execution screen (e.g., the home screen 621) may further include an object (e.g., an icon to provide the search function) configured to display a screen for providing the search function, as well as the recent area 621*a* including the aforementioned file information 620*b* and an icon. Without being limited to the description, the object may be displayed on a menu screen, based on a call of the menu screen on the home screen 621.

According to various embodiments, in operation 2005, the electronic device 200 may display the execution screen of the first application for classification of multiple files according to multiple pieces of additional information. For example, as illustrated in 2101 of FIG. 21, based on receiving a selection of an object (e.g., an icon for providing of a search function) further configured to display the search function, the electronic device 200 may display an execution screen 2110 of the file application 611 for selection of specific additional information for respective additional information types associated with files. As illustrated in 2101 of FIG. 21, the additional information types may include time information 2111, a file type 2112, or an application format 2113 corresponding to an application package, but may further include various types of aforementioned information stored in the file database 400 without being limited to the description and/or illustration. The execution screen of the file application 611 may include multiple objects representing specific information for each type of the additional information. For example, the execution screen 2110 of the file application 611 may include an object indicating yesterday, an object indicating a week ago, and an object indicating 30 days ago, which correspond to the time information 2111. As another example, the execution screen 2110 of the file application 611 may include objects indicating media files, such as image, video, and audio, an object indicating a document file, an object indicating an installation file, and an object indicating other download files, which correspond to the file type 2112. As another example, the execution screen 2110 of the file application 611 may include objects corresponding to the application package names 2113 stored in the file database 400, respectively.

According to various embodiments, the electronic device 200 may receive, in operation 2007, a selection of first information for specific additional information from among multiple pieces of additional information, and may display, in operation 2009, an execution screen including at least one first file having the received first information from among the multiple files. For example, as illustrated in 2101 of FIG. 21, when a specific object (e.g., an object indicating a download file) for a specific type of additional information (e.g., a file type) among multiple types of additional information is selected, the electronic device 200 may identify identifiers of files having, as additional information, other download files stored in the file database 400. As illustrated in 2102 of FIG. 21, the electronic device 200 may identify files corresponding to the identified identifiers of files among the multiple files stored in the memory 340, and may display an execution screen 2121 including information 2122 on the identified files. Information on the identified files may include thumbnails of the files, file names, and time at which the files are stored.

According to various embodiments, an electronic device (e.g., the electronic device 200 of FIG. 2) may be provided, the electronic device (e.g., the electronic device 200 of FIG. 2) including a memory (e.g., the memory 340 of FIG. 3), and at least one processor (e.g., the processor 330 of FIG. 3), wherein the at least one processor (e.g., the processor 330 of FIG. 3) stores, in the memory (e.g., the memory 340 of FIG. 3), multiple files acquired based on execution of multiple applications and information on the multiple files, the information on the multiple files including first information on the multiple applications and second information associated with the multiple files, executes a first application, the first application including at least one of an authority or a function for acquiring the information on the multiple files, and displays a first execution screen of the executed first application, based on at least a part of the first information included in the information on the multiple files, the first execution screen having a partial area including multiple thumbnails associated with at least some of the multiple files and multiple icons corresponding to applications associated with the at least some of the multiple files from among the multiple applications, which are displayed at positions associated with the multiple thumbnails.

According to various embodiments, the electronic device (e.g., the electronic device 200 of FIG. 2) may be provided, in which the first application is an application implemented to manage the multiple files stored in the electronic device (e.g., the electronic device 200 of FIG. 2).

According to various embodiments, the electronic device (e.g., the electronic device 200 of FIG. 2) may be provided, in which the at least one processor (e.g., the processor 330 of FIG. 3) is configured further to identify the at least some of the multiple files associated with a specified time from among the multiple files, and display, based on the at least the part of the first information, the first execution screen of the executed first application, which includes the multiple thumbnails associated with the at least some of the multiple files and the multiple icons indicating the at least some of the multiple files.

According to various embodiments, the electronic device (e.g., the electronic device 200 of FIG. 2) may be provided, in which the at least one processor (e.g., the processor 330 of FIG. 3) is configured further to, based on the at least one of the authority or the function of the first application, acquire the at least some of the multiple files stored in the memory (e.g., the memory 340 in FIG. 3).

According to various embodiments, the electronic device (e.g., the electronic device 200 of FIG. 2) may be provided, in which the at least one processor (e.g., the processor 330 of FIG. 3) is further configured to identify, based on the first application, the at least the part of the first information from information on the multiple files, identify, based on the identified at least the part of the first information, multiple first applications used to acquire the at least some of the multiple files, and acquire the multiple icons indicating the multiple first applications.

According to various embodiments, the electronic device (e.g., the electronic device 200 of FIG. 2) may be provided, in which the first information includes an application package name.

According to various embodiments, the electronic device (e.g., the electronic device 200 of FIG. 2) may be provided, in which the second information includes at least one of link information associated with the multiple files, position information associated with the multiple files, or identification information on a user associated with the multiple files, and the at least one processor (e.g., the processor 330 of FIG. 3) is further configured to, when a first icon is selected from among the multiple icons, identify a type of the first application, and perform a specific function of the first application, based on third information corresponding to the type of the first application in the second information.

According to various embodiments, the electronic device (e.g., the electronic device 200 of FIG. 2) may be provided, in which the at least one processor (e.g., the processor 330 of FIG. 3) is further configured to, as at least a part of the performing of the specific function, identify multiple first files corresponding to a second application corresponding to the selected first icon from among the multiple files, and display a second execution screen including the identified multiple first files, based on the third information included in information on the multiple files, wherein on the second execution screen the multiple first files are displayed for each some files having the corresponding third information.

According to various embodiments, the electronic device (e.g., the electronic device 200 of FIG. 2) may be provided, in which the first application includes at least one of a first authority or a first function for editing the multiple files, and the at least one processor (e.g., the processor 330 of FIG. 3) is further configured to display at least one object for editing of the multiple first files, based on the at least one of the first authority or the first function.

According to various embodiments, the electronic device (e.g., the electronic device 200 of FIG. 2) may be provided, in which the at least one processor (e.g., the processor 330 of FIG. 3) is further configured to, as at least a part of the performing of the specific function, execute a second application corresponding to the selected first icon from among the multiple files, and display an execution screen of the second application, based on the third information.

According to various embodiments, the electronic device (e.g., the electronic device 200 of FIG. 2) may be provided, in which the second information includes at least one of link information associated with the multiple files, position information associated with the multiple files, or identification information on a user associated with the multiple files, and the at least one processor (e.g., the processor 330 of FIG. 3) is further configured to receive an input for selecting an object for search for the multiple files on the first execution screen of the first application, display, based on the received input, multiple objects corresponding to multiple pieces of additional information, and when a first object is selected from among the multiple objects, display a second execution screen of the first application, which includes information on at least one first file corresponding to first additional information corresponding to the first object from among the multiple files.

According to various embodiments, an operation method of an electronic device (e.g., the electronic device 200 of FIG. 2) may be provided, and the operation method includes storing, in a memory (e.g., the memory 340 of FIG. 3) of the electronic device (e.g., the electronic device 200 of FIG. 2), multiple files acquired based on execution of multiple applications and information on the multiple files, the information on the multiple files including first information on the multiple applications and second information associated with the multiple files, includes executing a first application, the first application having at least one of an authority or a function for acquiring the information on the multiple files, and includes displaying a first execution screen of the executed first application, based on at least a part of the first information included in the information on the multiple files, the first execution screen having a partial area including multiple thumbnails associated with the at least some of the multiple files and multiple icons corresponding to applications associated with the at least some of the multiple files from among the multiple applications, which are displayed at positions associated with the multiple thumbnails.

According to various embodiments, the operation method may be provided, in which the first application is an application implemented to manage the multiple files stored in the electronic device (e.g., the electronic device 200 of FIG. 2).

According to various embodiments, provided may be the operation method including identifying the at least some of the multiple files associated with a specified time from among the multiple files, and displaying, based on the at least the part of the first information, the first execution screen of the executed first application, which includes the multiple thumbnails associated with the at least some of the multiple files and the multiple icons indicating the at least some of the multiple files.

According to various embodiments, provided may be the operation method including acquiring the at least some of the multiple files stored in the memory (e.g., the memory 340 of FIG. 3), based on the at least one of the authority or the function of the first application.

According to various embodiments, provided may be the operation method including identifying, based on the first application, the at least the part of the first information from information on the multiple files, identifying, based on the identified the at least the part of the first information, multiple first applications used to acquire the at least some of the multiple files, and acquiring the multiple icons indicating the multiple first applications.

According to various embodiments, the operation method may be provided, in which the first information includes an application package name.

According to various embodiments, the operation method may be provided, in which the second information includes at least one of link information associated with the multiple files, position information associated with the multiple files, or identification information on a user associated with the multiple files, and operation method may include, when a first icon is selected from among the multiple icons, identifying a type of the first application, and performing a specific function of the first application, based on third information corresponding to the type of the first application in the second information.

According to various embodiments, provided may be the operation method, in which the performing of the specific function includes identifying multiple first files corresponding to a second application corresponding to the selected first icon from among the multiple files, and displaying a second execution screen including the identified multiple first files, based on the third information included in information on the multiple files, wherein on the second execution screen the multiple first files are displayed for each some files having the corresponding third information.

According to various embodiments, an electronic device (e.g., the electronic device 200 of FIG. 2) may be provided, the electronic device (e.g., the electronic device 200 of FIG. 2) including a memory (e.g., the memory 340 in FIG. 3) and at least one processor (e.g., the processor 330 of FIG. 3), wherein the at least one processor (e.g., the processor 330 of FIG. 3) is configured to store, in the memory (e.g., the memory 340 in FIG. 3), multiple files acquired based on execution of multiple applications and information on the multiple files, the information on the multiple files including first information on the multiple applications and second information associated with the multiple files, to execute a first application, the first application having an authority for the information on the multiple files, to display a first execution screen of the executed first application, based on at least a part of the first information included in the information on the multiple files, the first execution screen having a partial area including multiple thumbnails associated with at least some of the multiple files and multiple icons corresponding to applications associated with the at least some of the multiple files from among the multiple applications, which are displayed at positions associated with the multiple thumbnails, to identify, if a first icon corresponding to the first application is selected from among the multiple icons, multiple first files corresponding to the first application from among the multiple files, and to display a second execution screen including the identified multiple first files, based on at least a part of the second information included in the information on the multiple files, wherein on the second execution screen the multiple first files are displayed for each some files having the corresponding second information.

What is claimed is:

1. An electronic device comprising:
    a memory; and
    at least one processor, wherein the at least one processor is configured to:
    store, in the memory, multiple files acquired based on execution of multiple applications and information on the multiple files, wherein the information on the multiple files comprises first information on the multiple applications and second information associated with the multiple files,
    execute a first application, wherein the first application includes at least one of an authority or a function for acquiring the information on the multiple files, and
    control to display a first execution screen of the executed first application, based on at least a part of the first information, wherein a partial area of the first execution screen comprises multiple thumbnails associated with at least some of the multiple files and multiple icons corresponding to applications associated with the at least some of the multiple files from among the multiple applications, and the multiple icons are displayed at positions associated with and adjacent to the multiple thumbnails,
    wherein:
    the second information comprises at least one of link information associated with the multiple files, position information associated with the multiple files, or identification information on a user associated with the multiple files, and
    the at least one processor is further configured to identify the at least the part of the first information from the information on the multiple files, based on the first application, identify multiple second applications used to acquire the at least some of the multiple files, based on the identified at least the part of the first information, acquire the multiple icons indicating the multiple second applications, identify a type of the first application, when a first icon is selected from the multiple icons and perform a specific function of the first application, based on third information corresponding to the type of the first application in the second information.

2. The electronic device of claim 1, wherein the first application is an application implemented to manage the multiple files stored in the electronic device.

3. The electronic device of claim 2, wherein the at least one processor is further configured to:
    identify the at least some of the multiple files associated with a specified time from the multiple files, and
    control to display the first execution screen of the executed first application, which comprises the multiple thumbnails associated with the at least some of the multiple files and the multiple icons indicating the at least some of the multiple files, based on the at least the part of the first information.

4. The electronic device of claim 2, wherein the at least one processor is further configured to:
    acquire the at least some of the multiple files, based on the at least one of the authority and/or the function of the first application.

5. The electronic device of claim 1, wherein the first information comprises an application package name.

6. The electronic device of claim 1, wherein the at least one processor is further configured to as at least a part of performing of the specific function:
    identify multiple first files corresponding to at least one of the multiple second application corresponding to the selected first icon from the multiple files, and
    control to display a second execution screen comprising the identified multiple first files, based on the third information included in information on the multiple files, wherein on the second execution screen the multiple first files are displayed according to files having the third information corresponding to each other.

7. The electronic device of claim 1, wherein the first application includes at least one of a first authority or a first function for editing the multiple files, and
    the at least one processor is further configured to:
    display at least one object for editing of the multiple first files, based on the at least one of the first authority or the first function.

8. The electronic device of claim 1, wherein the at least one processor is further configured to as at least a part of performing of the specific function:
    execute at least one of the multiple second application corresponding to the selected first icon from the multiple files, and
    display an execution screen of the second application, based on the third information.

9. An electronic device comprising:
    a memory; and
    at least one processor, wherein the at least one processor is configured to:
    store, in the memory, multiple files acquired based on execution of multiple applications and information on the multiple files, wherein the information on the multiple files comprises first information on the multiple applications and second information associated with the multiple files,
    execute a first application, wherein the first application includes at least one of an authority or a function for acquiring the information on the multiple files, and
    control to display a first execution screen of the executed first application, based on at least a part of the first information, wherein a partial area of the first execution screen comprises multiple thumbnails associated with at least some of the multiple files and multiple icons corresponding to applications associated with the at least some of the multiple files from among the multiple applications, and the multiple icons are displayed at positions associated with and adjacent to the multiple thumbnails, wherein the second information comprises multiple pieces of additional information, and
    the at least one processor is further configured to:
    receive an input for selecting an object for search for the multiple files, on the first execution screen of the first application, control to display multiple objects corresponding to the multiple pieces of additional information, based on the received input, and control to display a second execution screen of the first application, which comprises information on at least one first file corresponding to first additional information corresponding to a first object from the multiple files, when the first object is selected from the multiple objects.

10. An operation method of an electronic device, the operation method comprising:

storing, in a memory of the electronic device, multiple files acquired based on execution of multiple applications and information on the multiple files, wherein the information on the multiple files comprises first information on the multiple applications and second information associated with the multiple files;

executing a first application, wherein the first application includes at least one of an authority or a function for acquiring the information on the multiple files; and controlling to display a first execution screen of the executed first application, based on at least a part of the first information, wherein a partial area of the first execution screen comprises multiple thumbnails associated with at least some of the multiple files and multiple icons corresponding to applications associated with the at least some of the multiple files from the multiple applications, and the multiple icons are displayed at positions associated with and adjacent to the multiple thumbnails, wherein:

the second information comprises at least one of link information associated with the multiple files, position information associated with the multiple files, or identification information on a user associated with the multiple files, and the operation method further comprises:

identifying the at least a part of the first information from the information on the multiple files, based on the identified at least the part of the first information;

identifying multiple second applications used to acquire the at least some of the multiple files, based on the identified at least the part of the first information;

acquiring the multiple icons indicating the multiple second applications;

identifying a type of the first application, when a first icon is selected from the multiple icons; and performing a specific function of the first application, based on third information corresponding to the type of the first application in the second information.

11. The operation method of claim 10, wherein the first application is an application implemented to manage the multiple files stored in the electronic device.

12. The operation method of claim 10, further comprising:

identifying the at least some of the multiple files associated with a specified time from the multiple files; and controlling to display the first execution screen of the executed first application, which comprises the multiple thumbnails associated with the at least some of the multiple files and the multiple icons indicating the at least some of the multiple files, based on the at least the part of the first information.

13. The operation method of claim 10, further comprising:

acquiring the at least some of the multiple files, based on the at least one of the authority and/or the function of the first application.

14. The operation method of claim 10, wherein the first information comprises an application package name.

15. The operation method of claim 10, wherein the performing of the specific function comprises:

identifying multiple first files corresponding to at least one of the multiple second application corresponding to the selected first icon from the multiple files, and controlling to display a second execution screen comprising the identified multiple first files, based on the third information included in information on the multiple files, wherein on the second execution screen the multiple first files are displayed according to according to files having the third information corresponding to each other.

16. An electronic device comprising:

a memory; and at least one processor, wherein the at least one processor is configured to:

store, in the memory, multiple files acquired based on executions of multiple applications and information on the multiple files, wherein the information on the multiple files comprises first information on the multiple applications and second information associated with the multiple files, execute a first application, wherein the first application includes an authority for the information on the multiple files, control to display a first execution screen of the first application, based on at least a part of the first information, wherein a partial area of the first execution screen comprises multiple thumbnails associated with at least some of the multiple files and multiple icons corresponding to applications associated with the at least some of the multiple files from among the multiple applications, and the multiple icons are displayed at positions associated with and adjacent to the multiple thumbnails, and wherein the at least one processor being further configured to:

identify multiple first files corresponding to the first application from among the multiple files if a first icon corresponding to the first application is selected from among the multiple icons, and control to display a second execution screen comprising the identified multiple first files based on at least a part of the second information included in the information on the multiple files, wherein, on the second execution screen, the multiple first files are displayed according to files having the second information corresponding to each other.

* * * * *